US008666757B2

(12) United States Patent
Suresh et al.

(10) Patent No.: US 8,666,757 B2
(45) Date of Patent: Mar. 4, 2014

(54) DETECTION OF UPCODING AND CODE GAMING FRAUD AND ABUSE IN PROSPECTIVE PAYMENT HEALTHCARE SYSTEMS

(75) Inventors: Nallan C Suresh, Irvine, CA (US); Jean de Traversay, San Diego, CA (US); Hyma Gollamudi, San Diego, CA (US); Anu K Pathria, San Diego, CA (US); Michael K Tyler, San Diego, CA (US)

(73) Assignee: Fair Isaac Corporation, San Jose, CA (US)

( * ) Notice: Subject to any disclaimer, the term of this patent is extended or adjusted under 35 U.S.C. 154(b) by 1926 days.

(21) Appl. No.: 10/295,589

(22) Filed: Nov. 15, 2002

(65) Prior Publication Data
US 2003/0158751 A1 Aug. 21, 2003

Related U.S. Application Data

(63) Continuation-in-part of application No. 09/606,575, filed on Jun. 28, 2000, now Pat. No. 7,379,880.

(60) Provisional application No. 60/357,386, filed on Feb. 15, 2002, provisional application No. 60/146,209, filed on Jul. 28, 1999.

(51) Int. Cl.
*G06Q 50/00* (2012.01)

(52) U.S. Cl.
USPC .......................................................... 705/2

(58) Field of Classification Search
USPC ............................. 705/10, 14, 26, 2, 7, 3, 11
See application file for complete search history.

(56) References Cited

U.S. PATENT DOCUMENTS

| 5,253,164 | A | * | 10/1993 | Holloway et al. ................. 705/2 |
|---|---|---|---|---|
| 5,359,509 | A | | 10/1994 | Little |
| 5,557,514 | A | * | 9/1996 | Seare et al. ....................... 705/2 |
| 5,577,169 | A | * | 11/1996 | Prezioso ......................... 706/52 |
| 5,819,226 | A | * | 10/1998 | Gopinathan et al. ........... 705/44 |
| 5,907,602 | A | * | 5/1999 | Peel et al. ................ 379/114.14 |
| 6,223,164 | B1 | * | 4/2001 | Seare et al. ....................... 705/2 |
| 6,253,186 | B1 | * | 6/2001 | Pendleton, Jr. .................... 705/2 |
| 6,317,517 | B1 | | 11/2001 | Lu |
| 6,334,132 | B1 | * | 12/2001 | Weeks ......................... 707/723 |
| 6,532,301 | B1 | * | 3/2003 | Krumm et al. ................ 382/170 |
| 6,820,071 | B1 | * | 11/2004 | Sullivan ......................... 706/50 |
| 2003/0037041 | A1 | * | 2/2003 | Hertz ................................ 707/1 |

FOREIGN PATENT DOCUMENTS

EP 0 349650 A1 * 10/1990 ........... G05B 19/403

OTHER PUBLICATIONS

Federal register, Department of Health and Human Services, Part II, May 12, 1998.*

* cited by examiner

*Primary Examiner* — John G Weiss
*Assistant Examiner* — Bennett Sigmond
(74) *Attorney, Agent, or Firm* — Mintz, Levin, Cohn, Ferris, Glovsky and Popeo, P.C.

(57) ABSTRACT

Fraud and abuse detection in an entity's payment coding practices includes the ability to search for fraud at all levels of the hierarchical coded payment system within the context of an unsupervised model. The model uses variables derived and profiles created at any level or at all levels of the hierarchical coded payment system to create a comprehensive description of the payment coding activities submitted by the entity. That description is compared with other peer entities to determine unusual and potentially inappropriate activity. The profiles created may themselves be utilized for purposes other than the detection of fraud and abuse.

33 Claims, 7 Drawing Sheets

DETECTION OF UPCODING AND CODE GAMING FRAUD AND ABUSE IN PROSPECTIVE PAYMENT HEALTHCARE SYSTEMS

CROSS REFERENCE TO RELATED APPLICATIONS

This application claims priority under 35 U.S.C. §119(e) to U.S. Provisional Application No. 60/357,386 entitled FRAUD AND ABUSE DETECTION OF HIERARCHICAL CODED PAYMENT SYSTEMS, filed on Feb. 15, 2002, by Nallan C. Suresh, et al.

This application is related to U.S. application Ser. No. 09/675,992, entitled SCORE BASED DECISIONING, filed Sep. 29, 2000, by Walter W. Lee, et al. ("Score Based Decisioning", which is a continuation-in-part of U.S. application Ser. No. 09/167,102, filed Oct. 5, 1998, by Krishna M. Gopinathan, et al., and U.S. application Ser. No. 60/195,156, filed Apr. 6, 2000, by Walter Lee, et al.

This is a continuation-in-part of U.S. application Ser. No. 09/606,575, entitled CASCADED PROFILES FOR MULTIPLE INTERACTING ENTITIES, filed Jun. 28, 2000, by Anu K. Pathria, et al. ("Cascaded Profiles application"), which claims priority under 35 U.S.C. §119(e) from U.S. Provisional Application No. 60/146,209, filed on Jul. 28, 1999.

Each of the above applications is commonly owned. Each of the above applications is incorporated by reference in its entirety into this specification.

BACKGROUND

1. Field of the Invention

This invention relates generally to the detection of fraud or abuse of hierarchical coded payment systems, including for example Prospective Payment Systems. In particular, the invention relates to automated fraud detection using predictive modeling and analysis of payment coding methodologies to identify at multiple levels of the hierarchical coded payment systems patterns of payment coding having high probabilities of fraud. This invention also relates to profiling of the various entities that are involved in such hierarchical coded payment systems.

2. Background of Invention

The Scope of Healthcare Fraud Problems

According to the Center for Medicare and Medicaid Services (CMS—formerly the Health Care Financing Administration (HCFA)), annual health care expenditures in the United States totaled over $1.4 trillion dollars in 2001, and are expected to increase 6.5% a year. Of this amount, a significant percentage is paid on fraudulent or abusive claims, though the amount lost to health care fraud and abuse can never be quantified to the dollar. In May 1992, U.S. General Accounting Office (GAO) reported that the loss amounted to as much as 10% of the nation's total annual health care expenditure, approximately $84 billion. A July 1997 audit of annual Medicare payments by the Inspector General found that approximately 14 percent of Medicare payments (about $23.2 billion) made in fiscal year 1996 was improperly paid, due to fraud, abuse, and the lack of medical documentation to support claims. Many private insurers estimate the proportion of health care dollars lost to fraud to be in the range of 3-5%, which amounts to roughly $30-$50 billion, annually. It is widely accepted that losses due to fraud and abuse are an enormous drain on both the public and private healthcare systems.

The Hierarchical Coded Payment System

One type of payment system for services involves a hierarchical coded payment system. With the hierarchical coded payment system, service providers and/or service users (e.g., facilities, institutions, beneficiaries) are paid specific predetermined payment rates for types of services rendered. Typically, the hierarchical coded payment system comprises a multiple-level classification scheme, where payment is determined by coding a particular transaction or service according to a hierarchical classification and payment structure. As will be described below, one example of such a hierarchical coded payment system includes the Prospective Payment System (PPS) used by the CMS to administer payments from healthcare providers under Medicare, or similar PPS used by Medicaid, other government programs, as well as private health insurance carriers. Fraudulent and abusive coding practices by service providers using the PPS continue to be ineffectively addressed by conventional approaches.

Conventional Approach for Fraud Detection in the Prospective Payment System

The PPS legislation was passed in 1982 by Congress to make the Medicare hospital payment system more cost-efficient for inpatient services. In its continued effort to curtail rising Medicare costs and maintain solvency, Congress also passed the 1997 Balanced Budget Act (BBA), which broadened the PPS approach to several other types of medical care such as PPS—exempt hospitals, inpatient rehabilitation hospital services, skilled nursing facility services, hospital outpatient department services, outpatient rehabilitation services, and home health services. Prior to the introduction of each of these PPS approaches, the Medicare payments were based on a "fee-for-service" system operating under a rate schedule. Under Medicare PPS, the amount paid for medical care is based on a clinical assessment and industry norms, regardless of the actual cost of care (with some adjustments for regional cost differences and other factors). Providers are paid a fixed rate (either per diem or an overall rate, depending on the type of facility) for an illness or a stay at a facility based on the average industry costs of caring for patients.

Another way of characterizing PPS approaches, is that a facility gets paid for an entire episode of care or set of services, rather than for each individual transaction of service provision. The amount each facility gets paid depends upon the classification of the services received by the patient. The method of classification varies according to the type of facility. For example, the classification may depend on the diagnosis or the severity of a medical condition requiring treatment.

Implementation of the PPS system was phased into Medicare gradually, with hospitals commencing in 1983, Skilled Nursing Facilities (SNFs) in 1998, and Home-Health Agencies (HHA) in 2000 and Outpatient Hospital facilities in 2001, to be followed by Inpatient Rehabilitation facilities, Swing Bed facilities, and Long Term Care Hospitals in 2002. Eventually, almost all of Medicare is expected to eventually convert to the PPS, although the full timetable has not been set for this process. The PPS approach was initially conceived for the Medicare payment system; however, other institutions are increasingly adopting the PPS, including Medicaid, private insurers, and national single-payer healthcare systems.

The intent of the PPS is to ensure that service providers, facilities in particular, provide patient care that is centered on both cost-effectiveness and high quality, as opposed to the old Medicare payment system, which focused on quality alone without regard to cost. Under the PPS, facilities are encouraged to deliver clinically appropriate care in a cost-effective manner. It was also hoped that the PPS would reduce the amount of fraud and abuse in claims for payment for services rendered by reducing the opportunity for such activities. However, fraudulent practices are still on the rise. For example, in the case of PPS coded payment classifications based on diagnosis, the facility may nevertheless commit fraud by manipulating the diagnosis codes to put the customer (i.e., patient) into a different (e.g., more expensive) category, resulting in a higher payment being collected by the facility.

Conventional approaches to detecting such fraud in a hierarchical coded payment system are directed at detecting fraud for a single transaction of service. In the case of the PPS, the conventional approach might involve looking for fraud at the single level of diagnosis codes (e.g., Principal Diagnosis codes used by Inpatient Hospital PPS). However, this approach suffers from the limitation of fraud detection analysis focused on only a portion of all data representing coding practices of service providers. As a result, fraud cannot be detected at different levels of the hierarchical coded payment system using conventional approaches.

Accordingly, to detect fraudulent and abusive practices and behavioral patterns, it would be beneficial to use more of the available information in a more general context of the practice of service providers requesting payment for services through a hierarchical coded payment system. What is needed is an automated system and method that detects fraud and abuse within various classification elements of the hierarchical coded payment system, and across each classification level of the hierarchical coded payment system. Additionally, what is needed is an approach that detects fraud and abuse comprehensively throughout the hierarchical coded payment system.

SUMMARY OF THE INVENTION

The present invention provides a methodology and architecture for modeling and classifying coding practices in hierarchical coded payment systems, for use in such applications as identification of fraud and abuse. In general, detection of fraud and abuse is based on the use of predictive modeling (statistical analysis), and the analysis of coding patterns and behaviors of service providers and/or service users (e.g., facilities, institutions, beneficiaries) to determine an indicator of fraudulent or abusive payment coding activities. In this aspect, the present invention includes a method for determining potentially fraudulent service provider activity in a hierarchical coded payment system. Summary variables are calculated from claims data related to the particular type of entity (e.g., a healthcare facility) for selected metrics associated with the hierarchical coded payment system. The claims data includes requests for payments of healthcare services related to the entities, where the services or underlying patient conditions are coded in the hierarchical payment scheme. Normalized variables are determined based on comparing the summary variables with industry-wide peer data for the particular metric. An indicator is derived from the normalized variables to represent the potentially fraudulent service provider activity.

Detection of fraud and abuse with the present invention includes the ability to identify aberrant patterns at all levels of the hierarchical coded payment system within the context of an unsupervised model. The model uses variables derived at any level or even at all levels of the hierarchical coded payment system to create a comprehensive description of the payment coding activities submitted by the facility. That description is compared with other peer facilities to determine unusual and potentially inappropriate activity.

As an example, one aspect of the present invention allows comprehensive detection of fraud and abuse by considering all possible pairs of payment groups (or simply "groups" with respect to a selected metric. A group is a classification level used to define a payment structure for services, and includes a plurality of lower level services in the hierarchy. The all-possible-pairs analysis avoids restricting the analysis of data to specific few groups as with conventional approaches. For each possible pair of groups, there is a norm value for the metric in the proportion of one group relative to the other group. The present invention uses an unsupervised model to detect a facility that significantly departs from the norm in any of the constructed pairs of groups.

Also, by examining a facility's charging behavior within a group, the level of care provided by the facility can be predicted from the facility's payment coding practices. In particular, this approach is beneficial for detecting fraud where the payment is fixed regardless of the length of stay and where patients may be discharged early, thus leading to poor quality of care.

One implementation of the invention relates to the detection of fraud or abuse by hospital facilities being reimbursed under the Medicare Inpatient Hospital Prospective Payment System (PPS). More recent Medicare PPS, approaches now currently in use, such as Inpatient Rehabilitation (IRF PPS), Skilled Nursing Facilities (SNF PPS), Home Health (HH-PPS), Outpatient Hospital (OPPS), Long-Term Care Hospitals (LTCH-PPS), etc., can also benefit from the invention, as well as all future Medicare PPS developments. Additional non-PPS healthcare settings where the invention may be used go beyond Medicare's scope, to include the pharmacy insurance system, as well as physicians' fee-for-service and capitation payments. The latter is exemplified by the use of Principal Inpatient Diagnostic Cost Groups (PIP-DCGs) for risk-adjusting managed care payments (see "Medicare Part C" in Table 1, below). Moreover, Medicare is only one of several possible healthcare systems in which the present invention may be deployed. Others include Medicaid PPS, private insurer's PPS, and national-payer healthcare PPS, by way of example.

Furthermore, the present invention is applicable outside of the specific healthcare environment described herein. Generally, the invention may be used in any payment context where there is a hierarchy of at least two classification levels, at a minimum comprising primary classification elements mapping to an aggregate classification level upon which pricing is determined. It must be noted that any of the classification levels, other than the one upon which pricing is determined, may be obtained in a pre-determined manner or in a data-driven approach. Other applicable hierarchical coded payment embodiments include an integral number of classification levels, where pricing is determined at one of those levels (for example, at the primary level, the most aggregated level, or somewhere in between).

The present invention is further useful in a variety of applications, other than fraud and abuse detection. For example, the profiling capabilities of the present invention may be used to determine a facility's quality of care, enabling insurers to identify both high and low quality providers. Additionally, the present invention may be used to identify poorly defined groups within the payment classification, and thereby improving the grouping of elements. The present invention may also be used in risk adjustment for cost models for healthcare budgeting, such as by insurers and providers. The present invention is further useful outside of the healthcare setting, for example: for determining worker's compensation insurance premiums, which are based on groupings of job descriptions into risk related job classifications; for fraud and abuse detection in worker's compensation; or for improving the mappings of job descriptions to class codes for risk analysis.

The present invention may be embodied as a software implemented process, executing on a conventional computer, or as a software product on a computer readable medium, which controls the operations of a computer, and which includes functional modules that provide the processes to generate transactional data, determine profiles, and determine a fraud indicator based on a scalar scoring method, or as part of a computer system.

The features and advantages described in this summary and the following detailed description are not all-inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, a resort to the claims being necessary to determine such inventive subject matter.

DESCRIPTION OF THE PREFERRED EMBODIMENT

Figure 6:
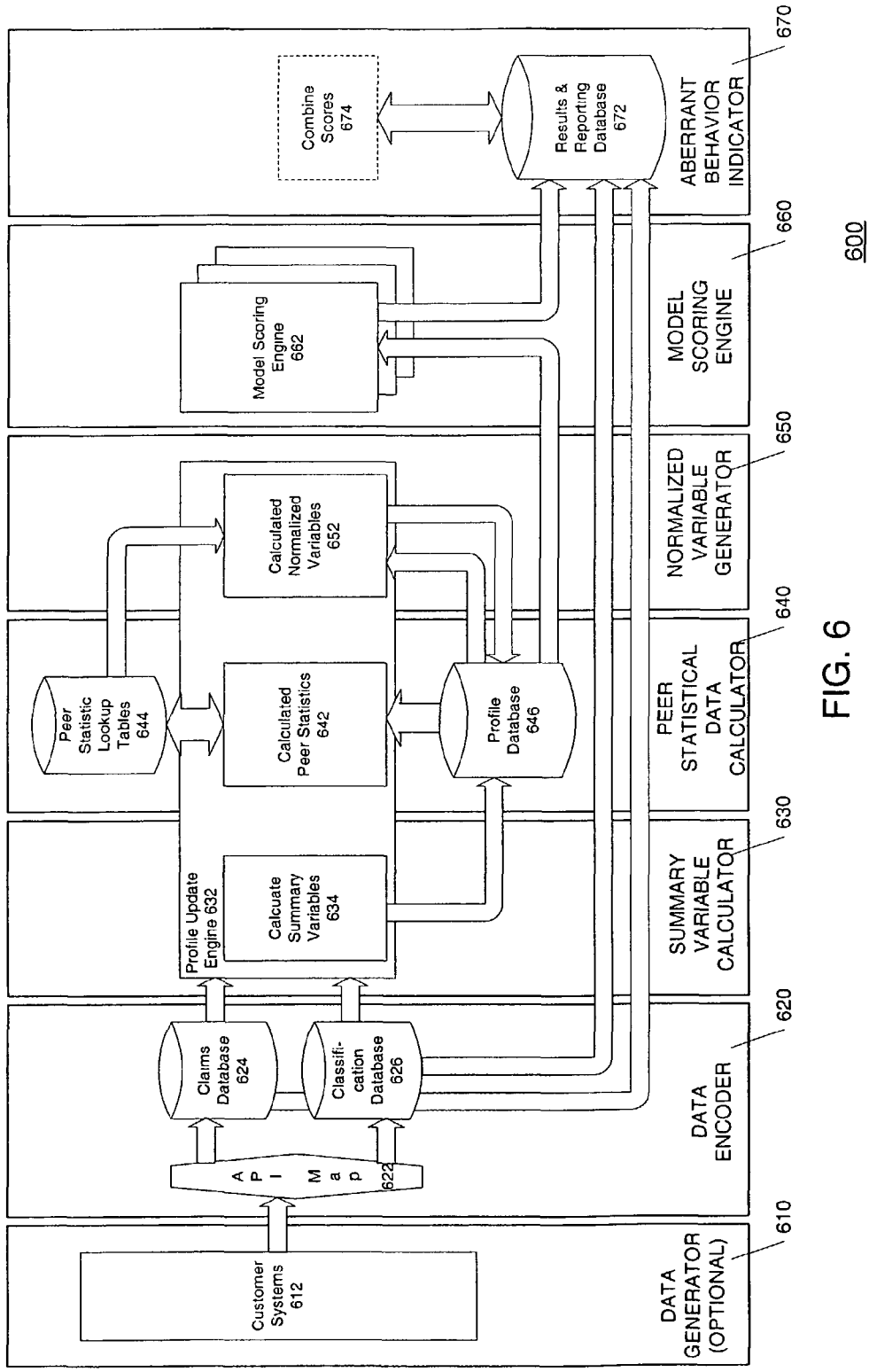
FIG. 6 is a block diagram of one embodiment of a fraud and abuse detection system for a hierarchical coded payment system.

1. Examples of Hierachical Coded Payment Systems
A. System and Process for Fraud or Abuse Detection Reference is now made to FIGS. 6-9 to describe one embodiment of a system 600 and corresponding process 900 for entity classification generally, and fraud and abuse prediction particularly. FIG. 6 depicts a block diagram of one embodiment of a fraud and abuse detection system 600. System 600 includes an optional data generator 610, a data encoder 620, a summary variable calculator 630, a peer statistical data calculator 640, a normalized variables generator 650, a model scoring engine 660, and an aberrant behavior indicator 670. FIG. 9 illustrates a process flow 900 for this embodiment of a system.

Optional data generator 610 includes customer systems 612 that produce batch data. Examples of customer systems 612 generally include computer hardware and software which may be specially constructed for the required purpose, or may comprise a general-purpose computer selectively activated or reconfigured by a computer program stored in the computer. In another example, customer system 612 may be any device, system or computer medium from which the batch data in electronic form can be transmitted to the data encoder 620. Those of skill in the art will appreciate that the invention may be practiced without data generator 610, as the batch data may be produced in a variety of ways, and provided to the data encoder 620.

Data encoder 620 includes an interface 622, claims database 624, and classification database 626. Interface 622 receives the batch data from customer systems 612. The contents of claims database 624 are provided to a results and reporting database 672. Similarly, the contents of classification database 626 are provided to database 672.

Interface 622 generally functions to map the batch data into a standardized format. This includes filtering the batch data according to criteria required by the particular application of system 600. For example, interface 622 can be implemented as an application program interface (API) and will be referred to as API 622 interchangeably for convenience. API 622 comprises a set of function calls used by an application program to communicate with another program that provides services for it. Those of skill in the art will understand that examples of APIs include calls made by an application program to those programs such as an operating system, a messaging system, or database management system. In accordance with one embodiment of the present invention, the API 622 filters from the batch data, "raw data" comprising: (1) claims' files data representing transactional data encoded according to payment claims made by facilities utilizing the hierarchical coded payment systems; and (2) classification data files required for fraud detection amongst the hierarchical coded payment system. The claims' files data is stored in claims database 624, and the classification data files are stored in classification database 626. The "raw data" stored on the claims database 624 and classification database 626 can be prepared for bulk loading into the other databases of system 600, as will described subsequently. These various formatting and filtering steps are indicated as database operations 910 in FIG. 9.

Figure 7:
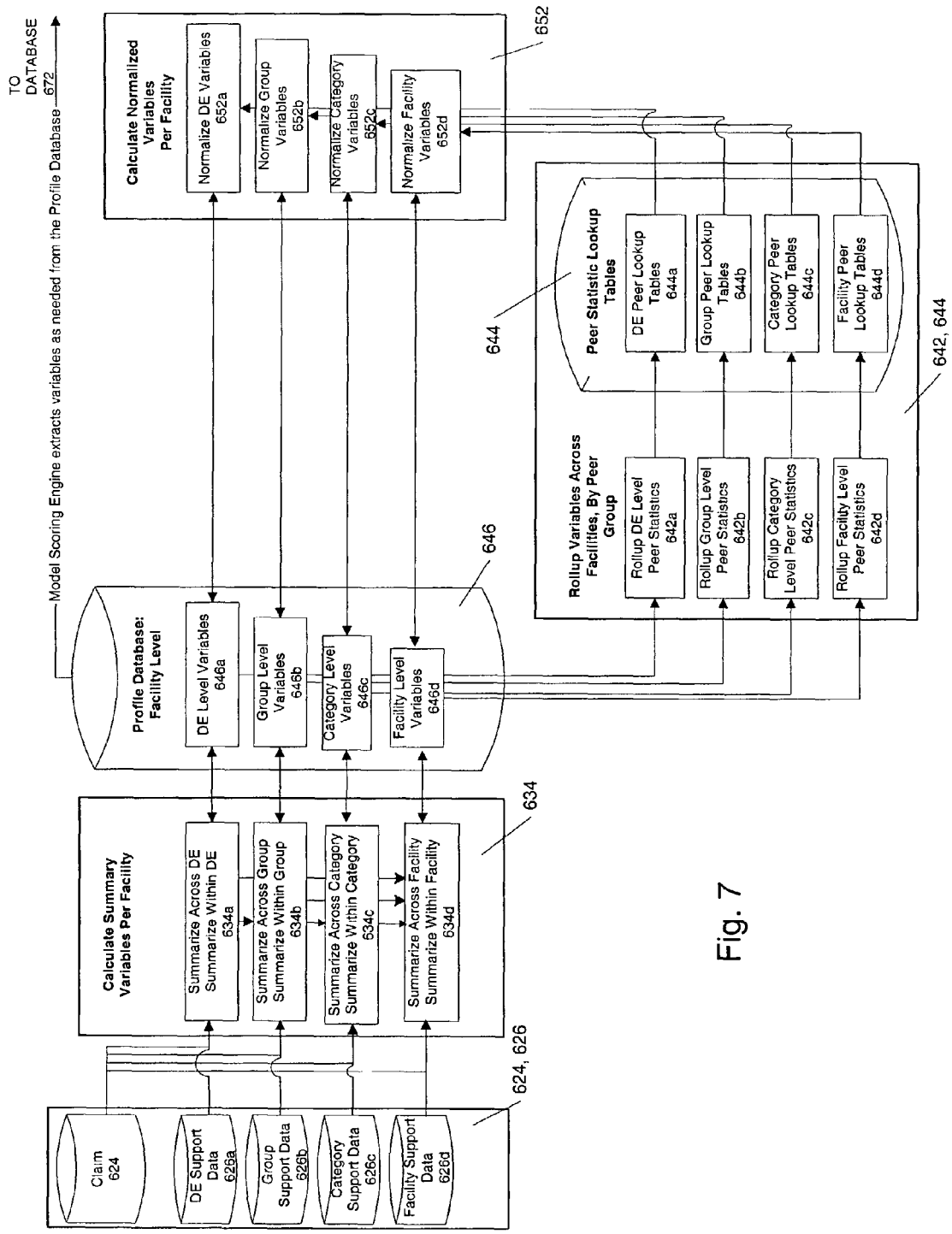
FIG. 7 is a detailed block diagram of a PPS variable creation process for the system of FIG. 6.

FIG. 7 illustrates further details of the claims database 624 and classification database 626. Claims' files data generally includes the set of claims submitted by facilities, typically organized by transactional history. The classification data files generally comprise the classification level data for the hierarchical coded payment system. For example, classification database 626 includes a driving element level database 626a, a group level database 626b, a category level database 626c, and a facility database 626d. The databases include the payment codes according to how they are classified by the hierarchical coded payment scheme, and can also include the associated attributes, such as weights, and payment indices, by way of example.

Collectively, the summary variable calculator 630, the peer statistical data calculator 640, and the normalized variables generator 650 form a profile update engine 632, which generates 920 the profiles of the entities being analyzed. In FIG. 6, profile update engine 632 is sub-divided into three modules. These three modules include a module 634 for determining the summary variables to generate profiles, a module 642 for determining statistical data associated with a facility's peers, and a module 652 for normalizing the profiles with the peer data. The profile update engine 632 will be described in more detail below.

Summary variable calculator 630 includes module 634, which receives claim data and classification data. Module 634 receives the input claim data and summarizes it across the classification levels for the facilities. As will be described in more detail subsequently, module 634 summarizes input data across and within classification entities of the hierarchical coded payment system. For example, these classification entities can include providers as well as beneficiaries. In FIG. 7, module 634 includes: sub-module 634a for summarizing variables across the driving element level and within driving elements; sub-module 634b for summarizing variables across the group level and within the groups; sub-module 634c for summarizing variables across the category level and within categories; and sub-module 634d for summarizing variables across facilities and within facilities.

The summary variables calculated per facility are stored in the profile database 646. One method of implementing sub-modules 634a-d is with the generation of profiles as described in the Cascaded Profiles application. In the context of the present invention, the term "profile" is used to denote a set of behavioral features (profile variables) that figuratively represents an "outline" of an entity. A profile may be understood as a summary of historical (and/or ongoing) transactional behavior of the entity, which ideally eliminates the need to store details of all historical transactions that are summarized by the variables of module 634. The values of the profile variables can be used to characterize the different members belonging to an entity, e.g., driving elements, groups, categories, beneficiaries and service providers. The primary intention of a profile is to capture the behavioral characteristics of an entity's members as exhibited through their transactions, in as complete a manner as possible. The profile variable of an entity may be generally defined as a formulation that converts data from a set of transactions involving the entity to a scalar quantity that summarizes (e.g., across the driving element level, within driving elements) some aspect of that entity's transactional activity.

Once the profile variables have been derived at the various levels of the hierarchical coded payment system, they are then rolled up to the facility level or a sub-level using cascaded profiling techniques for input into an unsupervised (i.e., outlier detection) model in accordance with the techniques disclosed in the Cascaded Profiles application.

The peer statistical data calculator 640 includes a module 642 for determining 930 statistical data associated with a facility's peers, which is coupled to database 644 for storing peer statistic lookup tables, and to database 646 for storing profiles. Module 642 of profile update engine 632 reads the profiles from the profile database 646 and creates the peer statistic lookup tables, which are stored in database 644.

FIG. 7 depicts further details of module 642, comprising the roll-up driving element level peer statistics 642a, roll-up group level peer statistics 642b, roll-up category level peer statistics 642c, and the roll-up facility level peer statistics 642d. FIG. 7 also illustrates that profile database 646 can store profiles arranged by driving element level variables 646a, group level variables 646b, category level variables 646c, and facility level variables 646d. Furthermore, FIG. 7 also illustrates more details about peer statistic lookup tables stored in database 644. In particular, database 644 includes an arrangement of tables according to driving elements peer lookup tables (LUTs) 644a, group peer LUTs 644b, category peer LUTs 644c, and facility peer LUTs 644d. In an alternative embodiment, the peer statistical look-up tables may be derived independently from system 600 and accessed as needed by system 600.

Figure 8:
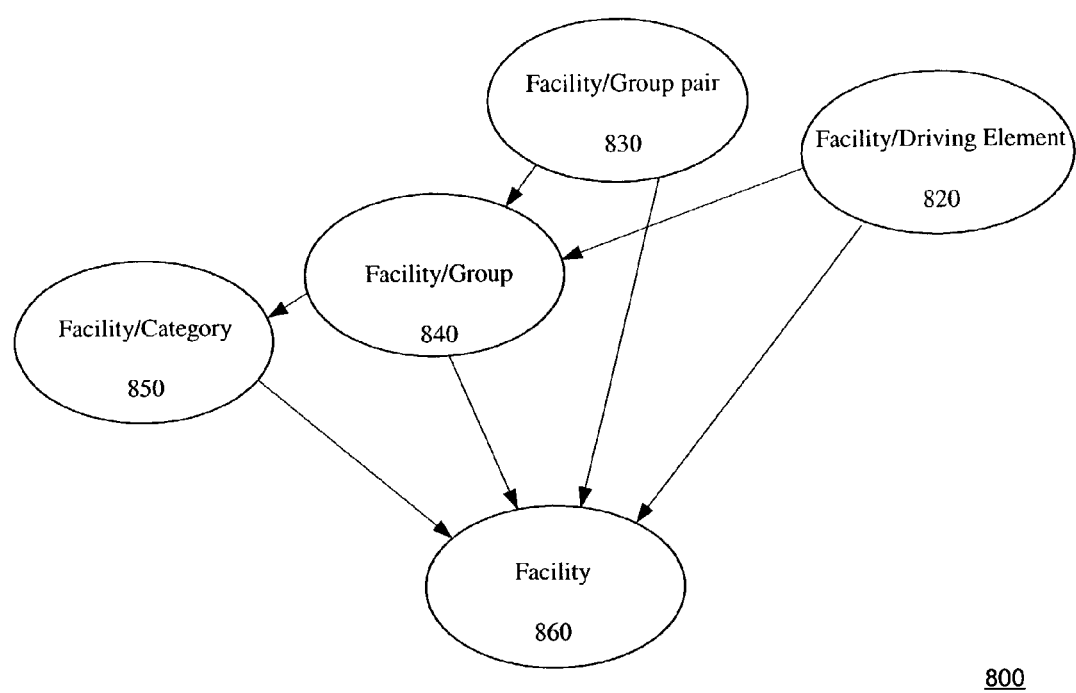
FIG. 8 illustrates an example of cascading profile for a PPS model.
Figure 9:
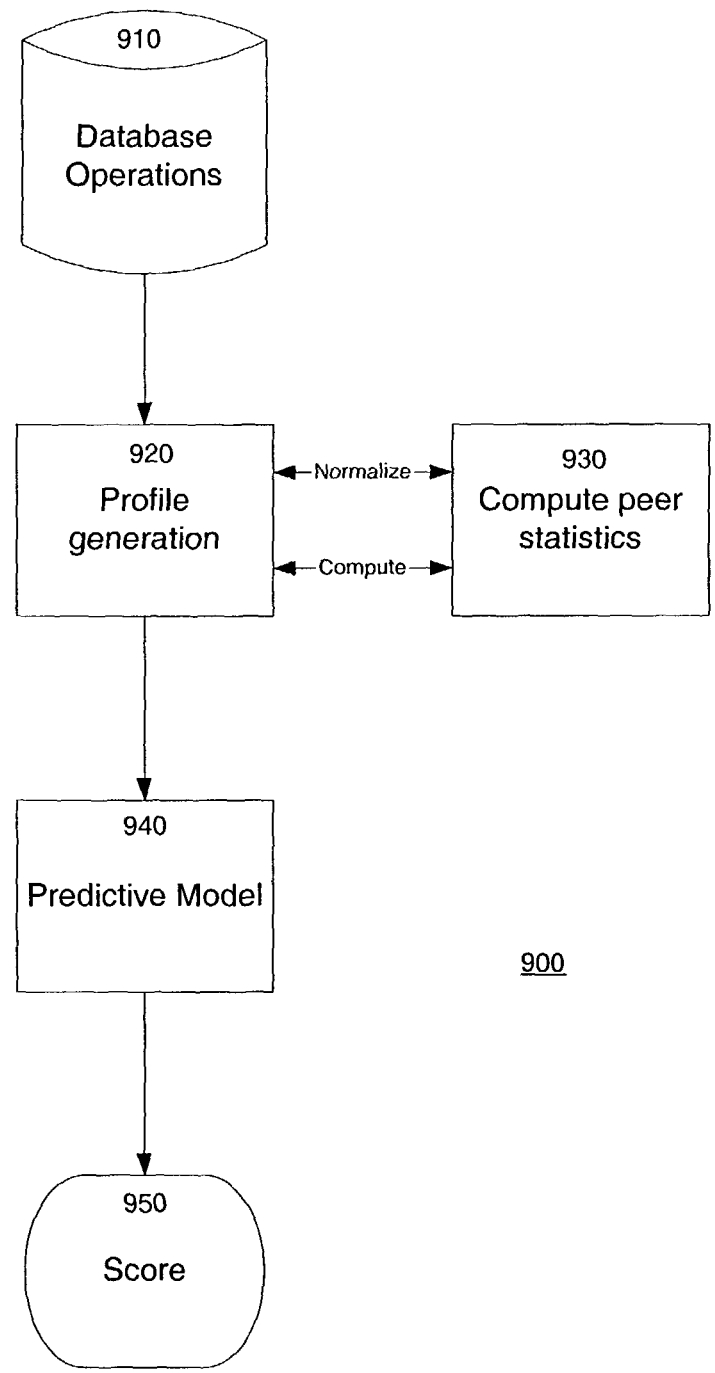
FIG. 9 illustrates a generic flow diagram encompassing claims data through profiling and scoring.

FIG. 8 illustrates an exemplary cascading profile 800 for a PPS model, with the roll-up (indicated by arrows) of driving elements 820, group pairs 830, groups 840, and categories 850 into facilities 860. The details of the roll-up process are described in the Cascading Profiles application, as indicated above. The roll-up process is applied to each profile variable to obtain the entire set of desired profile variables for the roll-up entity. The cascading process is accomplished by making separate passes through the transaction data to compute features based on each different entity. On each pass, new features are computed, merged and/or roll-up using any features that have been computed on previous passes.

Referring back to FIG. 6, the normalized variables generator 650 includes module 652 for normalizing the raw summary statistics for each entity (profile data) against the peers for that entity. Module 652 receives profile data from database 646, and peer statistic data from database 644. The normalized variables generated by module 652 are then stored in database 646. FIG. 7 depicts further details of module 652, which include normalized driving element variables 652a, normalized group variables 652b, normalized category variables 652c, and normalized facility variables 652d.

Model scoring engine 660 includes at least one module 662 (also labeled model scoring engine for simplicity) for performing 940 score based decisions according to the model scoring methods disclosed in the Score Based Decisioning application, incorporated above. Profile data is transferred from database 646 to module 662. In general the model scoring engine 662 loops through the profiles received from database 646 and scores each entity through the model. The most important variables (or families of variables) behind the score are usually provided along with the score to help better understand which are the behavioral areas of highest concern (as suggested by the profiles and the model). Model scoring engine 662 can include multiple models, each pulling a specific set of variables from the profile database 646. The model results and final statistics are generated and stored in the results & reporting database 672.

Aberrant behavior indicator 670 comprises results & reporting database 672 for storing results and reports, and a score combination module 674. Score combination module 674 receives score data, claim data and classification data for each entity from database 672, and loops through the entity list to associate 950 the individual models scores for each entity into a single score for that entity. The single score represents the fraud and abuse indicator that is generated through the comparison of a facility's coding behavior with the industry peers using the profile update engine 632. This single score (and, if available, its associated reasons) is stored in database 672 for subsequent retrieval. Those of skill in the art will appreciate that numerous techniques for equating a score value with potential fraudulent activity can be used, including associating a threshold value with the score value, the indicator representing the potentially fraudulent service provider activity when a score value exceeds the threshold value. While the score generated in this embodiment is used for fraud and abuse identification, in other embodiments, the score will indicate other qualitative assessments, such as quality of care, degree of risk adjustment, and the like, depending on the application design.

In general, system 600 permits entities to run batches of data through the fraud and abuse detection system 600. For example, a batch of data can include a year's worth of data at a transactional level or periodic data updates. The batch of data can be treated as an independent unit, where none of the profiles or statistics from prior years is used. Those of skill in the art will realize that other ways of characterizing this large batch data include: (1) data being generated from "scratch;" and (2) a predetermined set of data.

Several exemplary applications of system 600 are described below.

B. General Characteristics of a Hierarchical Coded Payment System

Figure 1:
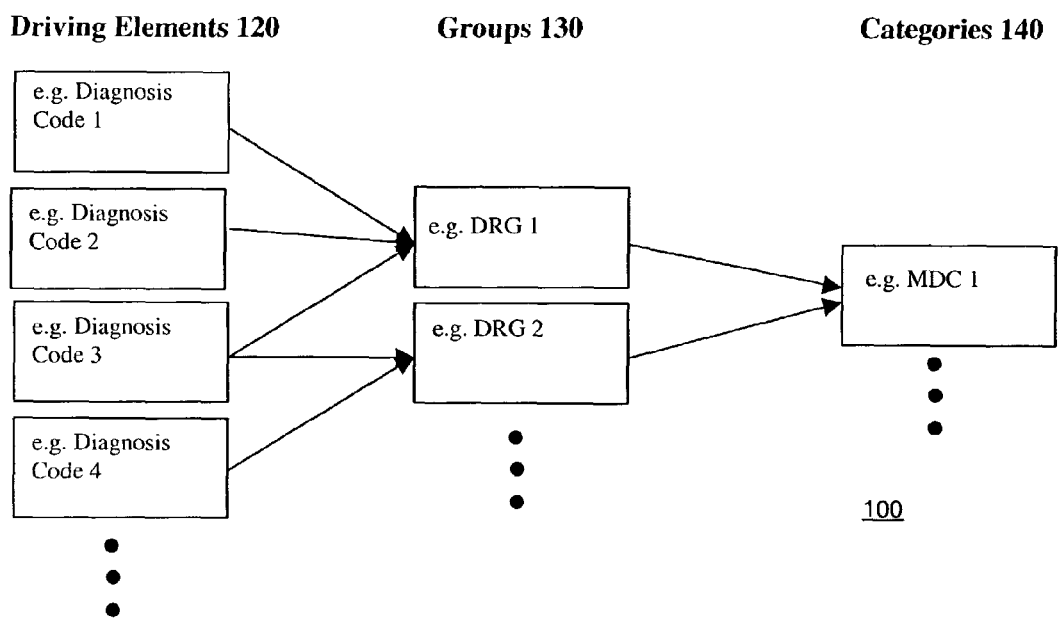
FIG. 1 is diagram of an exemplary classification scheme for a hierarchical coded payment system.

FIG. 1 illustrates a hierarchical coded payment scheme 100, which is used to code the claims data input into system 600. The hierarchical coded payment scheme 100 includes multiple classification levels including a driving element level 120, a group level 130, and a category level 140. It will be appreciated that the terms "driving elements," "groups," and "categories" are merely convenient labels for mapping one level of classification in the coded payment scheme 100 to another. Additionally, those with skill in the art will appreciate that such labels will change depending upon the context and application of the particular hierarchical coded payment system. In addition, while the focus here is on payment hierarchies, other financial or numerical grouping hierarchies may also be analyzed using the methodologies and architecture of the present invention.

In general, standardized payment amounts are determined using the hierarchical coded payment scheme 100 as follows. The driving element level 120 represents the primary (i.e., elemental or leaf node) level of classification. For example, the driving element level 120 can include a plurality of driving elements (e.g., Diagnosis Codes 1-4), which represent transactional events or classifications of different services. In the field of Medicare Inpatient Hospital PPS, the driving elements may vary depending on the Diagnosis Related Group (DRG). For certain DRGs, the elements could include various diagnosis codes for specific diseases and conditions, procedure codes for the services performed, or perhaps even combinations of procedure and diagnosis codes.

Each of the driving elements is further classified at the secondary (or intermediate) layer of the hierarchy (e.g., one level up from the driving element level 120), the group level 130. In the context of the Medicare Inpatient Hospital PPS, the group level 130 corresponds to DRGs. Thus, in the example of FIG. 1, the diagnosis codes 1-3 are classified under DRG 1, while diagnosis codes 3-4 are related to DRG 2. Note that a given driving element (e.g., diagnosis code 3) can be classified under multiple groups, i.e., a one-to-many relationship in the hierarchy.

The groups (e.g., DRG 1, DRG 2) in group level 130 can be further classified (or aggregated) one level up or across the hierarchy scheme 100 to a tertiary level, the category level 140. In this example, the categories are Major Disease Category (MDCs). Thus, DRG 1 and DRG 2 can be classified under category MDC 1. The mapping from a group level 130 to a category level 140 is a many-to-one relationship, in that a group (e.g., DRG 1) only belongs to one category MDC 1, but a category will contain many groups. By contrast, driving elements (e.g., Diagnosis Codes 1-4) are not unique to particular groups, creating a many-to-many organization. Consequently, a particular driving element (Diagnosis Code 3) may belong to (i.e., map to) more than one group, such as DRG 1 and DRG 2. This may occur because multiple driving elements can be used simultaneously to determine a group. FIG. 1 thus generally represents that primary classification elements (e.g., driving elements Diagnosis Codes 1-4) are themselves classified under a first aggregate level of classification elements (e.g., DRG 1, DRG 2), which are classified under other levels of classification elements (e.g., MDC 1). It will be appreciated that although three layers of classification are depicted in FIG. 1, any integral number of layers can form a hierarchical coded payment scheme 100. Table 1 provides example of various driving elements, groups, and categories for various PPS systems.

TABLE 1

Driving Elements, Groups, and Categories in various PPS and related applications currently used by CMS.

| PPS Application | Driving Element | Group | Category |
|---|---|---|---|
| ASC-PPS | HCPCS I, II (from the UB-92) | [8] ASCPG (ASC payment group) | n/a |
| (IH) PPS | I9, I9 procedure, age, gender, discharge status (from the UB-92) | [523] DRG | [25] MDC |
| SNF PPS | Resident assessments (including ADLs) and relative weights developed from staff time data (all captured in MDS) | [44] RUG + [18] modifier = [792] HIPPS | MRC |
| HH PPS | Clinical, Functional (ADLs), and Service domain (all captured by OASIS) | 'H' + (translated) [80] HHRG + [8] data condition indicator = [640] HIPPS | MRC |
| OPPS | HCPCS I, II (from the UB-92) | [1075] APC | APMC |
| IRF PPS | I9 (for the RIC), functional measurement (motor and cognitive), age, comorbidities (all captured by the IRF PAI) | [4] cc + [25] CMG = [100] HIPPS | [21] RIC |
| Medicare Part C risk adjustment | I9 (encounter data) | [172] DxGroups | [16] PIP-DCG |
| SB PPS (identical to SNF PPS) | Resident assessments (including ADLs) and relative weights developed from staff time data (all captured in MDS) | [44] RUG + [18] modifier = [792] HIPPS | MRC |

TABLE 1-continued

Driving Elements, Groups, and Categories in various PPS and related applications currently used by CMS.

| PPS Application | Driving Element | Group | Category |
|---|---|---|---|
| LTCH-PPS | I9, I9 procedure, age, gender, discharge status (from the UB-92) | [501] LTC-DRG | [25] LTC-MDC |

TABLE 2

Legend for Column 1 of Table 1

| | |
|---|---|
| ADLs | Activities of daily living (assessment of) |
| APC | Ambulatory Payment Categories |
| APMC | Ambulatory Payment Major Categories |
| ASC | Ambulatory Surgical Center |
| ASCPG | ASC Payment Group |
| cc | complication and comorbity |
| CMG | Case-Mix Groups |
| DRG | Diagnosis Related Groups |
| DxGroups | Diagnostic Groups |
| HCPCS | HCFA (Health Care Finance Administration) Common Procedure Coding System |
| HHRG | Home Health Resource Groups |
| HIPPS | Health Insurance PPS coding system (6 byte payment code used across various PPS approaches) |
| I9 | ICD9-CM (International Classification of Diseases Version 9 Clinical Modification for the USA) Diagnosis (3 + 2 bytes) and procedure(2 + 2 bytes) codes |
| IH | Inpatient Hospital |
| IRF | Inpatient Rehabilitation Facility |
| IRF PAI | IRF Patient Assessment Instrument |
| LTCH | Long-Term Care Hospital |
| MDC | Major Diagnostic Categories (usually by physiological system) |
| Medicare Part C | a.k.a. "Medicare + Choice", the managed care program of Medicare Major Resource Category |
| MRC | |
| n/a | not applicable |
| OASIS | Outcomes and Assessment Information Set |
| OPPS | Outpatient Hospital PPS |
| PPS | Prospective Payment System |
| RIC | Rehabilitation Impairment Categories |
| SB | Swing Bed (facility) |
| SNF | Skilled Nursing Facility |
| UB-92 | (Uniform Billing form 1992) Standard CMS Part A (facility) claim |

Payment for services rendered may be specified in the hierarchical coded payment scheme 100 at any of the classification levels 120, 130, 140 shown in FIG. 1, whether it be at the primary level (e.g., driving element level 120), the most aggregated level (e.g., category level 140), or somewhere in between (e.g., group level 130). In other words, a given transaction or service may be coded with codes from any or all levels of the hierarchy. For each classification instance, e.g., a specific driving element, group, or category, a predetermined set of payment factors is defined, which may include a particular dollar amount, offsets, multipliers, and other values used to determine a payment for a service so classified. Thus, a service provider is paid on the basis of the payments associated with the classifications of the services it has rendered.

While hierarchical coded payment systems were meant to help reduce fraud and abuse incurred by service providers submitting claims for payment, such systems still leave room in which they may occur. As one simple example, a service provider can fraudulently "upcode" a claim by performing a service classified under a particular DRG which has a higher payment value than a similar service associated with a different lower payment DRG. It will be understood that although hierarchical coded payment systems can be applied to a broad range of applications, the discussion of one type of hierarchical coded payment system in the nature of Prospective Payment Systems (PPS) used in the medical field is provided by way of example for the sake of simplicity, and to avoid obscuring the invention with unnecessary details. To this end, PPS fraud and abuse are means by which service providers, especially facilities, can select payment codes in a manner that inappropriately increases their reimbursements or inappropriately reduce their costs, often to the detriment of patients' health.

C. Medicare Inpatient Hospital Prospective Payment Systems

The Inpatient Hospital Prospective Payment System (IH-PPS) is one example of a hierarchical coded payment scheme 100. For example, the payment that the hospital facility will receive from Medicare for treating a patient with appendicitis depends on the predetermined payment rate for claims classified under the DRGs that contains the diagnosis codes for appendicitis. Those familiar with Medicare PPS will also recognize that there is a set of adjustment factors used in determining the payment rate, including: a wage index to account for differences in hospital labor costs; payments to account for differences in the mix of patients treated across facilities; an add-on payment for hospitals that serve a disproportionate share of low-income patients or incur indirect costs of medical education; and an additional payment for cases that are unusually costly, called payment outliers. The specifics of the set of adjustment factors are not discussed to avoid obscuring the invention with unnecessary details.

Although categories in the category level 140 are not usually required to be used directly, in order to determine a payment amount for services under the Medicare PPS (though they may be used initially to identify the payment group), they can be used for other types of analyses. For example, a Major Disease Category can serve as a high-level indicator of the nature of the service provided, especially if such service can be characterized as specialty services typically associated with higher payment rates. Thus, detecting coding practices which associate a facility with certain categories having higher payment rates can be used to indicate probabilities of fraud, especially when this coding practice appears aberrant when compared to industry or peer group norms for that facility.

Those of skill in the art will recognize that the scheme 100 of FIG. 1 is exemplary, and that the present invention is not limited to the Medicare PPS context described for FIG. 1. Rather, the basic structure of a hierarchical coded payment system is applicable beyond medical facilities and Prospective Payment Systems. Additionally, the details of each hierarchical coded payment system may vary depending on the type of service provider and the context of services provided. As will be noted in the example to follow which discusses skilled nursing facilities, not all facilities use the Principal Diagnosis at the driving element level 120, the DRG at the group level 130, nor MDC at the category level 140. For each type of facility, the nature of the classification level of the hierarchy depends on the nature of the services rendered. As used herein, the term "facilities" includes all manner of service providers or service users, i.e. institutions, beneficiaries, recipients, and customers, all of which can be used interchangeably depending on the context of the applicable field. By way of example in the health arena, institutions can include hospitals, nursing homes, mental health centers, rehabilitation centers, and home healthcare providers.

D. Skilled Nursing Facilities Prospective Payment System

The present invention is also applicable to the field of Skilled Nursing Facilities (SNFs), which implemented a prospective payment system (PPS) for Medicare recipients. The SNF PPS has impacted all areas of operation both clinically and financially, spanning increased demands on the Minimum Data Set (MDS) process to the implementation of consolidated billing for Medicare part A services. In general, facilities are reimbursed under the SNF PPS according to Resource Utilization Groups (RUG) (currently Version III) which uses the MDS. The MDS is a federally mandated standardized clinical assessment completed on all residents in a SNF; the MDS assessment data is used to classify residents into one of 44 payment categories at the RUG level of a SNF hierarchical coded payment system.

The categories at the RUG level differ based on the amount of care a resident (i.e., recipient of the service provided) needs and the time it takes to provide that care. For example, more than 100 questions on the MDS are tied to calculating the appropriate RUG class, yielding exemplary primary classification elements ranging from cognitive level, indicators of depression, activity of daily living (ADL) dependency including assistance provided, and clinical conditions, treatments, or diagnoses, by way of example. Typically, the more skilled care a resident needs, the higher the reimbursement. The task of grouping a resident into one of the 44 RUG classifications can be complex, such that a computerized "grouper" software may be utilized. In general "grouper" software is used to check for criteria the resident has met, and can also be used to determine the resident's RUG class. Typically, each of the 44 groups is associated with a value or weight. This value may be adjusted by wage and salary information depending upon the state.

In turn, the RUGs are mapped to another classification level comprising a plurality of categories. For the purpose of this invention, these have been titled Major Resource Categories (MRCs). For example, the 44 groups at the RUG level are further classified into seven MRCs. The MRCs correspond to seven major resident types, including: (1) rehabilitation; (2) extensive services; (3) special care; (4) clinically complex; (5) impaired cognition; (6) behavioral problems; and (7) reduced physical function.

The hierarchical coded payment scheme 100 of FIG. 1 can also be used to describe characteristics of the SNF PPS. In general, a Skilled Nursing Facility uses the MDS as a primary level of classification. The MDS maps to an intermediate classification level in the hierarchy directed to the RUGs, where a resident is classified into one of 44 groups according to clinical characteristics and assistance required. The RUGs are in turn further classified according to the MRCs, at the most aggregated classification level.

Despite the hierarchical structure of FIG. 1 being applicable for describing the coded payment structures associated with Medicare Inpatient Hospital PPS and SNF PPS, some distinction can be drawn. In comparison to hierarchical coded payment systems used for hospital service under Medicare Inpatient Hospital PPS, a stay in a SNF differs significantly from a stay in a hospital. Accordingly, groups that are defined for hospital stays are inappropriate for determining payments to SNFs. In general, hospitals (paid according to DRGs) are paid for the whole hospital stay, regardless of the number of days, while SNFs (paid according to RUGs) are paid per diem.

E. Description of the Model Addressing PPS Fraud and Abuse

One aspect of the fraud and abuse detection method of the present invention lies in its ability to detect aberrance at any or all of the levels of the hierarchical coded payment scheme 100. More specifically, the present invention allows the detection of fraud and abuse: (1) across each classification level of the hierarchical coded payment scheme; and (2) within each element (unit) comprising a classification level of the hierarchical coded payment scheme.

For example, the present invention is beneficial for detecting fraud and abuse at all levels of the PPS within the context of an unsupervised model. The unsupervised model advantageously allows various metrics to be selected as desired when investigating potential fraudulent and abusive service provider activities. Thus, with the present invention, fraudulent and abusive coding practices can be detected across the driving element level 120, across the group level 130, and across the category level 140. This flexibility further allows fraud and abuse detection within each of the driving elements (e.g., Diagnosis Codes 1-4), within each of the groups (e.g., DRG 1, DRG 2), and within each category (e.g., MDC 1).

An unsupervised model uses metrics derived at all levels of the hierarchy of a hierarchical coded payment system to develop summary variables and create a description of the activity performed by the service provider. This description is called a profile. The profile is then compared with other peer service providers, typically representative of a peer industry, to discern unusual and potentially inappropriate activity. The process by which the variables are derived is described below. The approach to the extraction of information from each of the classification levels is first addressed, followed by a description of the techniques to integrate the information at the different classification levels of the hierarchy into a global variable set for use by an unsupervised model.

F. Exemplary Applications of Fraud or Abuse Detection and Entity Profiling

The following sections deal with the profiling of entities at the various levels of the hierarchical coded systems. It is noted again that these profiles developed at the various levels (e.g. facility/category level or facility/group level) may then be rolled up, as necessary, using the techniques described in the Cascaded Profiles application to provide profiles at the level of the target entity, usually service providers (or facilities). The sections address the information extraction and profiling at the highest aggregate level, which is the category level, the intermediary aggregate level or the group level and the primary classification level or the driving element level. Within each level description, the sections are further split into descriptions of profiling done across and within the various levels.

Before we address the profiling at various levels, we will first generally link the sections to the cascaded profiling flowchart in FIG. 8. A simple rule of thumb to note is that when information is extracted across a level for a scored or target entity such as a facility, then the profiles are created at a different level for the entity. To illustrate, when the information is extracted for a facility across MDCs, the profile is obtained directly at the facility level 860. Or, when the information is extracted across DRGs, the profile may be at the facility/MDC level 850, if we choose only DRGs that belong to the MDC, or directly at the facility level 860, if we choose to look across all DRGs. When the information is extracted within a level then the profiles are generally created at the same level. So, when it is within an MDC, then the profile is for a facility/MDC pair 850 or when the information is extracted within a DRG, the profile is for a facility/DRG pair 840. Therefore, we may look across driving elements or within groups, to obtain a facility/group pair profile, or conversely across groups and within driving elements to obtain a facility/driving element pair profile. Roll-ups to other entities may then be performed along the paths in FIG. 8.

In the sections that follow, we will indicate which module in FIG. 8 is being discussed. FIG. 9 gives a generic flow diagram of the process from the claims data through profiling to the scoring.

a) Highest Aggregate Level

One aspect of the present invention involves detecting fraud and abuse of coding practices using information extracted at the most aggregated classification level, such as at the category level 140. Using summary variables calculated with module 634c, fraud and abuse of payment coding practices can be detected either across the category level or within a particular category (i.e., across the groups within each category).

1. Fraud and Abuse Detection and Entity Profiling Across the Category Level

Examining a facility's data (according to some metric(s) derived from the claims files data) across the category level provides high-level indicators of the nature of work performed by a facility and may even serve to identity the facility as a specialty facility, such as a cancer hospital or a women's hospital. For example, we may use metrics that determine the dollar activity or claims activity of the facility in each of the categories. In this case the summary variables would be the fraction of payment amounts received (or claims submitted) by a facility in each of the categories, and will be calculated by profile update engine 632 for the category level 140. The calculation may be done according to the following equation $$D_i = \frac{X_i}{\sum_{j=1}^{N} X_j} \quad (1)$$

where $D_i$ is the fraction of payments (or claims) in category i, $X_i$ is the payment received (or claims submitted) in category i, and the denominator is the summation of the quantity X over all the N categories, to obtain the total payment received (or claims submitted) by the facility.

In both cases above (payment as well as claims), the distribution of the facility's coding behavior across categories may be obtained. The distribution can be generated from the information stored in the results and reporting database 672. Such a distribution can also be used to focus on a subset of those categories represented by the facility, if some subset is of particular interest. The variables computed across the categories are generally computed directly at the scored entity level, as in 860.

2. Fraud and Abuse Detection and Entity Profiling within a Category

Referring back to FIG. 1, within a particular category MDC 1, there are associated groups DRG 1 and DRG 2 that function to determine the amount of payment in an Inpatient Hospital Prospective Payment System. That is, different groups within a given category will have associated payment amounts for services in that group. One aspect of the present invention allows the computation of statistics about the distribution of payments that the particular facility receives within a particular category. This aspect is beneficial because the distribution may reveal that the facility is charging the higher-priced groups in that category more often that the facility's peers do. This may indicate that the facility is upcoding, which is a type of fraud and abuse of the hierarchical coded payment system where service providers select payment codes to cause higher payment reimbursements.

In the field of Medicare PPS, upcoding involves charging Medicare for a higher-payment group than the one that actually describes the patient's illness or care required. For example, the mean payment amount in the category may be high relative to its peer facilities. If the average payment per unit of service (e.g. payment per diem) is high, then the facility could be charging to the groups associated with higher payment amounts while discharging patients early. With the present invention, an indicator based on the comparison of a facility's coding practices within a group can be generated so as to trigger an investigation or closer scrutiny into potential upcoding or poor quality of care being committed by the facility.

An example of a DRG charging pattern for a facility measured against an average representation of similar DRG charging pattern across an industry will now be discussed. Referring to the hierarchical coded payment scheme 100 of FIG. 1, and for illustrative purposes, it will be assumed that category MDC 1 represents Diseases and Disorders of the Nervous System in Medicare Inpatient Hospital PPS. It is also assumed that group level 130 contains a total of 35 groups representing the various DRGs in MDC 1. Although not specifically shown, the 35 groups exhibit a wide range of associated weights and lengths of stay, such as: DRG 33 (Concussion for a patient aged under 17) with attributes such as a weight of 0.2085 and a length of stay of 1.6 days; and DRG 2 (Craniotomy for a patient over 17, including trauma), which is a surgical DRG having attributes such as a weight of 3.0147 with an average length of stay of 9.9 days.

Summarizing variables for the average DRG weight in MDC 1 are obtained using module 634c, by first determining the product of the number of claims in each DRG and its weight. The products of all 35 DRGs are then added to obtain a total weight indicator for MDC 1. This total weight indicator is then divided by the number of claims in MDC 1 to yield the average weight, as indicated in Equation (2).

$$AW = \frac{\sum_{i=1}^{n} N_i W_i}{\sum_{i=1}^{n} N_i} \quad (2)$$

where AW is the average weight in the MDC, $N_i$ is the number of claims in $DRG_i$ (which has a weight $W_i$) and n is the number of DRGs in the MDC. If the average weight in MDC 1 for a facility (profiled and stored in that portion 646c of profile database 646) is, say 2.25 while the norm is 1.25 (calculated from rolling up category peer statistics 642c and from peer statistical table 644c), then this facility will look aberrant (when normalized using module 652c) and appear to be charging to the higher DRGs in the MDC 1 (according to an indicator derived from aberrant behavior indicator 670).

Figure 2:
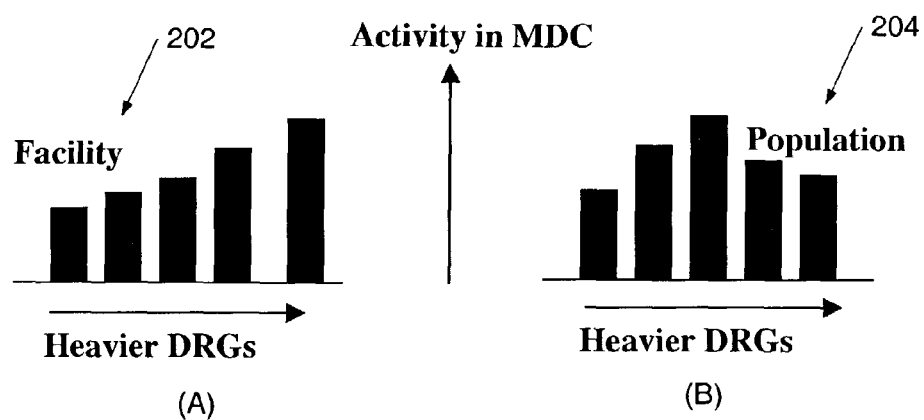
FIG. 2(A) illustrates a suspect facility's activity distribution (e.g., number of claims) in various groups.
FIG. 2(B) illustrates the population activity distribution for comparative purposes to FIG. 2(A).

FIGS. 2(A) and 2(B) show a schematic example comparing the distribution of DRG activity for an individual facility in MDC 1 compared to the population of facilities. FIG. 2(A) shows the distribution of the DRG charging pattern 202 for a particular facility can be obtained in accordance with an aspect of the present invention for detecting fraud and abuse within a category. The x-axis lists DRGs having higher payment amounts (e.g. weights) from left to right. The y-axis indicates the amount of claims made in each DRG. By comparison, FIG. 2(B) depicts the distribution of the charging pattern 204 for the population as computed in 644c, which can be determined from the national average (or some other established benchmark) DRG charging pattern for MDC 1. The figures show that with respect to this MDC, the facility tends to charge the higher weighted DRGs, relative to the peep population. It will become evident that the discrepancy in the distribution patterns 202, as may be computed by modules 646c and 642c, serves as an indicator of potential fraud and abuse by the particular facility.

Based on the distribution 202 in FIG. 2(A), indicators may be generated representing potential fraud and abuse by a facility in a variety of ways based on different parameters that are analyzed. For example, in addition to the metrics described above, other metrics such as length of stay in the category may be computed. A metric such as the average length of stay (for a patient in a hospital) for a DRG is typically well-correlated with the metric corresponding to the DRG weight. That is, heavier DRGs (i.e., higher weighted) tend to take more resources and also tend to require longer lengths of stay. For example, if the facility's average MDC 1 weight is 2.25 and its average length of stay parameter is 1.25 days, whereas the peer population's average weight and length of stay parameters in this MDC 1 are determined to be 1.25 and 3 days respectively, then this particular facility will seem aberrant with respect to both the average weight and the average length of stay for MDC 1. This implies that the facility has been discharging patients faster than the norm for the DRGs that it is claiming under MDC 1. A simple indicator such as Relative Weight (RW) shown in Equation 3, below, which is the average weight in the MDC, as calculated by Equation 2, divided by the average length of stay in the MDC, is one example of a way to quantify this association.

$$RW = \frac{AW}{(ALOS)} \quad (3)$$

where ALOS is the average length of stay in the MDC, obtained as in Equation 4, below.

$$ALOS = \frac{\sum_{i=1}^{m} LOS_i}{m} \quad (4)$$

where $LOS_i$ is the length of stay in the $i^{th}$ of m claims in the MDC. This indicator is beneficial because it can be the triggering point for investigation into whether the facility is not caring for its patients well, or whether patients are maybe not as ill and not utilizing as much of the resources as indicated by the DRG. All the variables computed within the category are generally computed at the scored entity/category level 850, which in the example flow diagram of FIG. 8 is the facility/category level. For profiling purposes and to use in an unsupervised model, these variables may be rolled up to level 860, as described in the Cascaded Profiles application.

b) Intermediary Aggregate Level

At the group level 130, information can be extracted to generate broad indicators of the facility's payment coding activities in the various groups. High-level snapshots of the facility's coding activities using a hierarchical coded payment system can be ascertained with the present invention, which allows facility coding information to be extracted and analyzed across the group level or within particular groups.

1. Fraud and Abuse Detection and Entity Profiling Across the Group Level

Conventional techniques of PPS fraud detection focus too narrowly on examining specific pre-selected groups or group pairs for signs of fraud or abuse. For instance, the Office of the Inspector General (OIG) might indicate, that, based on their research, there appears to be a trend in upcoding from DRG 89 (Simple Pneumonia [over 17 years of age] with Complications & Comorbidities, Weight: 1.08) to DRG 79 (Respiratory Infections with Complications & Comorbidities, Weight: 1.64). A conventional fraud detection query would then examine a specific facility and compare the usage of the more expensive DRG in the pair, DRG 79, to that of the less expensive DRG 89.

By contrast, one aspect of the present invention allows comprehensive detection of fraud and abuse by considering all possible pairs of groups, without restricting the analysis of data to a specific few groups. First, one could find the proportion of one group relative to the other group. This proportion may be given by a simple equation as shown in Equation 5

$$P_{G1} = \frac{N_{G1}}{N_{G1} + N_{G2}} \quad (5)$$

where $P_{G1}$ is the proportion, $N_{Gi}$, where i=1 or 2, is the number of counts of occurrence of groups 1 and 2, respectively. We may note that using the counts is only one instance of finding such a proportion. We may easily extend this to number of patients, dollars paid or another related metric.

For each possible pair of groups, there is a norm in the proportion of one group relative to the other group. The present invention uses an unsupervised model to detect a facility that significantly departs from the norm in any of the constructed pairs of groups. One method employed by the present invention is to consider the facility's activity across all groups, such as with module 634b using the metric comprising the proportion of claim counts in each of these groups. Those of skill in the art will readily recognize that this approach is more comprehensive than conventional approaches.

Whereas the conventional approach detects fraud only if the specific upcoding pair is already known, the present invention advantageously detects unknown and emerging fraud practices as well. Rather than assuming a priori knowledge of the precise form the fraud or abuse will take, as with conventional techniques, the present invention models a facility's data and identifies outliers.

For example, suppose that Skilled Nursing Facility (SNF) has 100 claims in a year for the RUG (Resource Utilization Group) type RUC (Ultra High Rehabilitation) having an attribute such as a cost index of 384.21, which can be used as a metric. The SNF also has 50 claims for RUG type PE2 (Physical Function some minimal Nursing Rehabilitation work) with a cost index of 153.28. Suppose that the SNF charges 66% of the RUGs in this pair to RUC, that is, the more expensive RUG. If the peer norm proportion for this pair is only 30%±5, then this SNF's coding practices do appear to be aberrant. The model allows all such possible RUG pairs to be profiled at once in module 634b, and rolls all the associated proportions of charges up to the facility level 646b, so that any signs of aberrance can be detected amongst them. The roll-up process is generally described in the Cascaded Profiles application, and includes: applying a (distributional) function to each RUG pair (644*b*); and converting the corresponding data across all RUG pairs into a single scalar quantity (652*b*). The variables calculated across groups may be calculated at any or all of levels 830, 840 and 850 and the roll-up may be performed along any of the paths shown in FIG. 8.

2. Fraud and Abuse Detection and Entity Profiling within a Group

Information may also be obtained within a particular group by looking at characteristics of that group. This approach can include looking at the driving elements contained within the group. A distribution of driving elements within a group can be examined, such as for example in the field of Medicare PPS. Several examples of the fraud and abuse detection within a group will now be discussed.

One metric that can be examined for a group includes the average length of stay or treatment for patients in that group. By examining a facility's charging behavior within a group, the level of care provided by the facility such as hospitals can be predicted from the facility's payment coding practices. In particular, this approach is beneficial for detecting fraud where the payment is fixed regardless of the length of stay and patients may be discharged early, thus leading to poor quality of care, such as in Medicare Inpatient Hospital PPS.

Typically, under an inpatient hospital PPS, the hospital gets paid a standard amount for each DRG, with few exceptions, regardless of the length of stay at the hospital. In order to maximize profit, the hospital benefits if a patient stays fewer days than the norm for that DRG, thereby consuming fewer resources while still eliciting the same payment. It is thus desirable to examine the average length of stay in each DRG for the facility and compare this information to the averages representing the peer group or industry norm for that DRG. If a hospital is routinely discharging patients early, their averages will be significantly below the peer or industry norms. This is an indicator of fraud and abuse.

An example is provided for illustrative purposes. DRG 124, Circulatory Disorders, for instance, is associated with a weight of 1.4134 and a nominal length of stay of 4.4 days. A facility that tends to discharge patients after about 2 days on the average will look aberrant, as this behavior implies that either: (1) that the patient is not treated well; or (2) that the DRG has been upcoded. This average length of stay for a DRG may be calculated using an equation similar to Equation 4 (where the average is instead calculated over the MDC rather than the DRG), which is reproduced here as Equation 6 below.

$$ALOS = \frac{\sum_{i=1}^{m} LOS_i}{m} \quad (6)$$

where m refers to number of claims in the DRG and $LOS_i$ refers to the length of stay on the $i^{th}$ claim for the DRG. Those skilled in the art will recognize that LOS geometric means are often used instead of arithmetic means in order to compensate for highly skewed LOS distributions.

Figure 3:
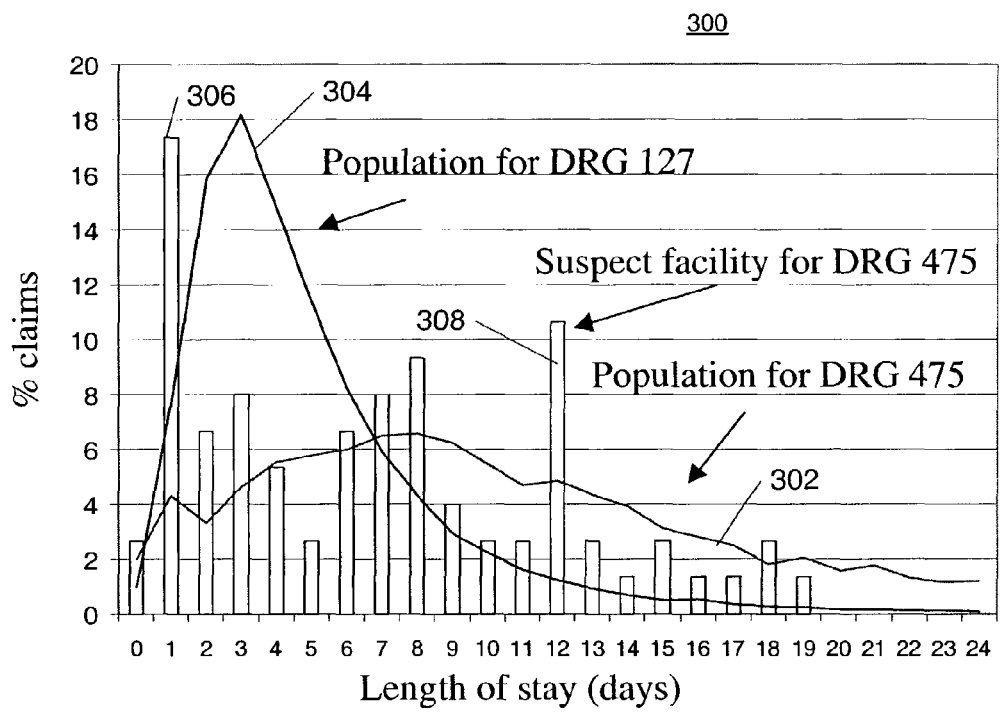
FIG. 3 illustrates an example of the distribution between the charging pattern for a facility as compared with the population at large.

The average length of stay for the DRG is calculated in module 634*b* and the comparison to the peers for the DRG as well as normalization is done in modules 642*b*, 644*b* and 652*b*, respectively. The rollup is then done to the facility level in 646*b*. Facilities that look aberrant in comparison to their peers, especially ones that tend to have a low average length of stay for a DRG, may then be investigated further. The following example shows the results of deeper investigation on a facility that had a low average length of stay for DRG 475 (Ventilator Support for respiratory diagnosis, associated with a weight 3.6936) of 7 days compared to a population average of 11.3 days. FIG. 3 shows the results in a distribution chart 300 providing input on a case of potential upcoding by a facility from DRG 127 (Heart Failure & Shock, weight 1.0130) to DRG 475. DRG 127 was chosen as one realistically possible candidate from which to upcode based on prior knowledge of OIG (Office of the Inspector General) investigations, and is given here purely for illustrative purposes. For DRG 475, the population average length of stay is 11.3 days, with a distribution is indicated by curve 302. For DRG 127, the average length of stay of 5 days and a distribution is indicated by curve 304. The bar chart of FIG. 3 depicts the suspect facility's length of stay distribution for its claims in DRG 475. There is a sharp peak 306 at the low length of stay (about 1 day) with many claims also at the higher lengths of stay, including a moderately sharp peak 308, which appears close to the average of 11.3 days. However, the peaks at the lower lengths of stay could imply that these patients were either discharged earlier than they should have been, or that their actual illness might have been covered by the lower weight DRG 127 and hence these claims might have been upcoded or indicate unusually early discharges. This facility's claims, especially the ones with the short stays under DRG 475, therefore might warrant further investigation.

The variables calculated within groups may be calculated at level 840 and the roll-up may be performed along any of the paths shown in FIG. 8.

c) Primary Classification Level

One aspect of the fraud and abuse detection method is its ability to delve into the fundamental aspects of the hierarchical coded payment system, such as the driving element. Conventional fraud detection systems do not provide this capability. The motivation behind detecting fraud and abuse at the primary classification level is to approach the fraud problem from the perspective of the coding of the claim submitted for payment. Typically, for most PPS approaches, the driving elements of each claim are automatically grouped together by health insurance software known as grouper software, in order to produce the appropriate group value for the claim (which then logically leads to determining the ensuing payment amount). The grouper software maps driving elements to groups, and thereby determines the payment. Accordingly, upcoding or abuse of the groups can often originate at the driving element level. Crucial insight into a facility's charging practices may be obtained, therefore, from an analysis of the distribution of the facility's activity across the driving element level and within driving elements.

1. Fraud and Abuse Detection and Entity Profiling Across the Driving Element Level There are several possible types of primary classification elements that can serve as the foundation of a PPS system. These will be generically referred to as "driving elements" for simplicity, and they vary depending on the type of facility. For an inpatient hospital PPS, one of the primary driving elements is the Principal Diagnosis. For a SNF PPS, the driving elements are combinations of many factors, which measure the utilization of resources. These factors, taken together, determine the RUG. A facility's activity across these driving elements can reveal much information about its charging practices. Table 1 above, indicates several other PPS approaches developed by CMS, each using domain-specific methodologies at the driving element level in order to consolidate an array of groups, sufficient enough to cover an adequate range of payment situations.

A facility that continually uses one particular driving element (or combination of driving elements) in order to bill a certain group will tend to look aberrant when compared to most such other facilities, where the driving elements that trigger billing to that group are more widely spread across all the various possible driving elements that map to that group. The facility's billing pattern may occur because the facility's management has encouraged more billing to some particular group, and the coding staff responded by choosing one code that they know maps to that group and making it the Principal Diagnosis on many claims, regardless of the actual diagnosis. Alternatively, the billing pattern may indicate that a facility is billing for fictitious patients and simply assigning them to that particular code. This type of fraud or abuse entailing the charging for fictitious patients is often done by charging to a group that is associated with a fairly low payment amount so that it will "fly under the radar." Several examples are described below.

For an inpatient hospital PPS, the driving element is the Principal Diagnosis on the claim. A DRG can be selected by many possible Principal Diagnoses, in some cases, as many as 30 or more. If a facility always uses one or two Principal Diagnoses for a DRG, when the population has a wider distribution for that DRG, this tendency might indicate a cause for concern.

An example is provided for illustrative purposes. DRG 296 (Nutritional and Miscellaneous Metabolic Disorders, weight 0.8594) is a frequently abused DRG, which contains over 20 possible Principal Diagnoses. Suppose that the population of hospitals use a range of diagnosis codes (as listed under the coding scheme of the International Classification of Diseases, Clinical Modification [ICD-9-CM] for the examples cited, but could be expanded to any coding scheme) to get to this DRG, such as 264.9 (Vitamin A deficiency), 267 (ascorbic acid deficiency), 265 (thiamine deficiency), etc., reflecting the various diagnoses for the patient population. If a particular facility tends to use only one diagnosis, such as 781.7 (tetany), or perhaps two diagnoses, consistently to achieve this DRG, this is considered aberrant and not necessarily reflective of the patient population. In this case, it is possible: (1) that the person coding the diagnoses to achieve the DRG is upcoding to get to this DRG as opposed to selecting a coded payment that is less expensive, and is constantly using one diagnosis to get to the DRG; or (2) that the patients are fictitious.

The summary variables are calculated in 634a with the peer statistics and comparison done in 642a and 652a. One may summarize the variables across driving elements at group level, or higher, with the corresponding normalizations. For example, within a DRG one may look at the variation in Principal Diagnoses, which could be a simple metric such as the number of unique Principal Diagnoses used by the facility for the DRG. This summary would then be done in 634b, with the corresponding peer comparisons in 642b, 644b and 652b. In FIG. 8, the variables would then be at level 840 (facility/group). If we looked at all the unique Principal Diagnoses used regardless of DRG, the variables would then be at level 860.

2. Fraud and Abuse Detection and Entity Profiling within Driving Elements

Another aspect of the present invention that improves upon conventional PPS fraud detection systems is the analysis of a facility's coding practices within driving elements. This aspect addresses the very core of the PPS. Those familiar with the PPS will recognize that payment amounts are based on groups, and that groups are ascertained from the driving elements by means of the grouper software. When a facility maximizes reimbursement fraudulently, it may bill to a higher paying group that may be related to the actual group, in that it shares a common feature with the group (e.g., they both map to the same category). Alternatively, a facility can attempt to maximize reimbursement fraudulently by billing to a group that is unrelated in any way to the proper group that should be billed, as was described above. Fraud and abuse detection, that involves billing to groups related to each other through driving elements, can be accomplished in the following two ways.

(A) Minor Modifications to Driving Elements

Facilities can commit fraud and abuse through minor modifications to the driving elements, which, while still keeping most of the coding claims unchanged, result in a higher paying group. One pattern of abuse stems from selecting the higher paying group, when it is associated with an illness similar to the actual illness, except that it uses more resources than required by the actual illness. A common example of this in an inpatient hospital PPS setting would be the addition of a Complication and Co-morbidity (CC) counterpart to a DRG. The CC is indicated by an additional diagnosis to the Principal Diagnosis, and relates to a complication in treating the principal condition. When a facility adds a CC diagnosis code to a claim, the Principal Diagnosis is not changed, but the CC usually results in a higher payment than would occur with the Principal Diagnosis alone. For example, in hospital billing, the Principal Diagnosis may be augmented by one or more CC codes when a secondary condition affects the treatment of the condition defined in the Principal Diagnosis (PD). Augmenting a Principal Diagnosis with a CC code may cause it to map to a different DRG than would that Principal Diagnosis alone.

Figure 4:
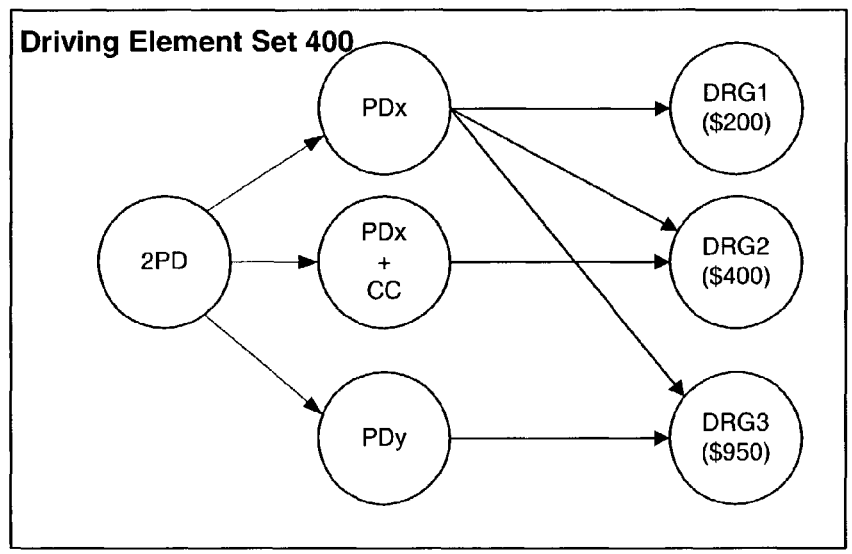
FIG. 4 illustrates a diagram of an exemplary driving element set, mapping driving elements to groups in one subset of the system of FIG. 1.

An aspect of the present invention addresses this type of billing fraud by calculating summary variables 634 representing activity across the various groups that may be mapped to by an individual, set, or a combination of driving elements. One example includes all the DRGs stemming from the first two characters of a Principal Diagnosis (noting that a PD generally maps to only one DRG, we scaled back the number of characters of the PD to generate a larger set of mapped DRGs—those skilled in the art will recognize how various diagnosis grouping methodologies can be used to identify the PD instead of the first two characters). FIG. 4 illustrates an exemplary Driving Element Set (DES) 400. The DES 400 includes a 2-character Principal Diagnosis (2PD) that can map to three DRGs, DRG1, DRG2, or DRG3, depending on whether there is a particular complicating factor present or that the remaining bytes of the Principal Diagnosis are different. It is assumed that the commonality between the DRGs stem from their sharing of the first two characters of the Principal Diagnosis. (Since the coding of the diagnoses is also hierarchical, there is a good possibility that many of these DRGs also relate to similar illnesses and therefore present greater potential for upcoding between them.) With no complicating factor and for a particular 5-byte principal diagnosis, PDx, the 2PD maps to DRG 1. With a complicating factor, PDx+CC, the 2PD maps to DRG 2. With slightly different last three characters of the principal diagnosis, PDy, 2PD maps to DRG 3. The DES 400 for the 2PD includes DRG 1, DRG 2, and DRG 3, since those are the groups to which the 2PD may be mapped.

One manner of detecting fraud using the DES 400 is to examine the average payment amount or the average per unit payment amount for each DES. In the field of SNF PPS, the per diem payment amount is the metric that is examined against industry norms for each DES. Those of skill in the art will understand that only claims that have payments associated therewith should be considered. If the facility is charging towards the high end (i.e., the more expensive groups for each of these sets), compared to the norm measured by industry peers, then the facility's charging behavior is suspicious. The equations used here are similar to equation 2, except the category is replaced by the two character principal diagnosis and the set of DRGs is now the DES.

Another manner of detecting fraud using the DES 400 is to select a metric representing pairs of groups within the DES 400. That is, for all possible group pairs within a DES 400, the proportion of the higher-payment group in the pair should be examined against all other pairs within the DES 400. In FIG. 4, there are three pairs to be examined, namely: DRG1 and DRG2; DRG1 and DRG3; and DRG2 and DRG3. The equations here are similar to equation 5, repeated below in equation 6, with DRGs being the relevant grouping scheme, and the roll-up is also similar to the roll-up done for the exhaustive set of DRG pairs.

$$P_{DRG1} = \frac{N_{DRG1}}{N_{DRG1} + N_{DRG2}} \quad (6)$$

Several examples will now be discussed to illustrate the advantages of using the DES 400 for fraud detection. Those familiar with the payment codes for Medicare Inpatient Hospital PPS will recognize that under the broad category of Infectious and Parasitic Diseases, the following DRGs share '05' as the first two bytes of the driving Principal Diagnosis code: 020, 489, 079, 021, 368, 272, 018, 185, 422, 073, 046, 350, 019, 283, 421, 273, and 047. There is a greater possibility of upcoding among these DRGs, than between these DRGs and those in another set. In order to obtain DRGs that share a common trait, the first two characters of the Principal Diagnosis can be used to map to a few DRGs. Several metrics that can be selected for comparison with industry and peer norms include the average DRG payment or the payment/LOS (length of stay) ratio (equation 3) in the 2-character Principal Diagnosis set.

Next, all possible high weight/low weight DRG pairs that belong in each subset can be examined as possible upcoding opportunities. In SNF PPS, VIA PPS, and Outpatient PPS fields, for example, the grouper software depends on a more complex combination of driving elements. However, a DES can still be formulated from each driving element individually, or a combination of a few driving elements, either of which would form the basis for commonality between the various groups, the RUGs, the HHRGs, or the APCs (see several other examples in Table 1).

These variables are computed in module 634a and compared to peers in 642a and 644a, with the normalization done in 652a. The roll-up is done to the facility level in 646d through 634d. In FIG. 8, the corresponding modules for creation of the profiles are 820 and 830, with the roll-ups performed along the possible paths shown in the figure.

(B) Selective Billing Amongst Possible Driving Elements

Another method used by facilities, for inappropriately billing driving elements in their relation to groups, involves intentionally selecting a driving element from all driving elements available in order to increase the payment amount. This facility behavior may or may not involve adding or modifying information to the claim. The fraudulent behavior, however, frequently involves elevating one or more driving elements to a higher status (e.g. elevating a Secondary Diagnosis to the Principal Diagnosis).

Conventional software is commercially available to assist inexperienced medical coders in choosing the correct driving elements on which to base the group. For example, the software will apply official rules to all of the diagnoses on a claim and select which diagnosis should be listed as the Principal Diagnosis, while still properly following CMS rules and regulations. Using such software does actually help improve the quality of coding and reduce abuse of the PPS system. However, other conventional software exists, with its primary design purpose aiming at maximizing the payment for a claim or a set of claims. More specifically, such a software circumvents proper rules, by systematically exchanging each of the secondary diagnoses in succession with the Principal Diagnosis until it finds the highest paying DRG. For example, if a patient is admitted to the hospital with a heart problem, diabetes, and a broken arm, the software will choose which of the three diagnoses to use as the Principal Diagnosis based strictly on the size of the payment associated with each. In a SNF PPS, HHA PPS or other PPS facility, this payment maximization process can be more complex, but the same underlying selection of primary elements can be applied with the main purpose of maximizing payments. Use of this type of software (or the corresponding manual process) constitutes fraud. One aspect of the present invention is to address this particular type of PPS fraud.

Figure 5:
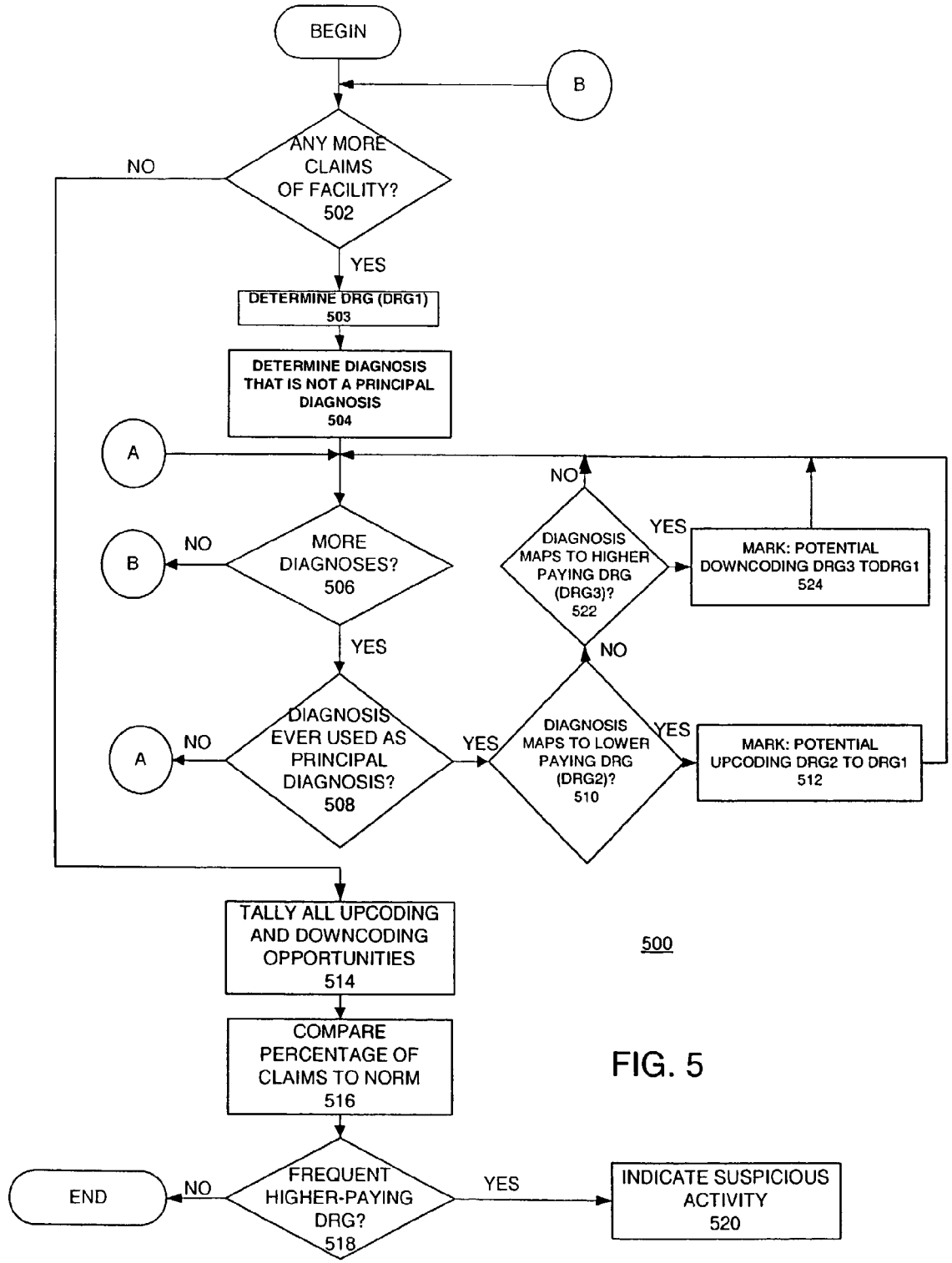
FIG. 5 is a flowchart of an exemplary process for fraud detection and abuse of hierarchical coded payment systems using driving element sets.

To address this PPS fraud type consisting in selecting codes to achieve maximum payment, the present invention first identifies the possible pairs that may be subject to upcoding based on user selection, and which can then be incorporated into a profile using module 634. A metric associated with the proportion of the higher-paying group is then compared to the corresponding population norm calculated from modules 642 and 652. For hospitals, this is a fairly straightforward fraud detection process 500, as illustrated in the flowchart of FIG. 5. For each claim 502 from a given facility, a principal diagnosis $DRG_1$ is determined 503, and then all diagnoses on the claim that are not indicated as the Principal Diagnosis are identified 504. For each of those diagnoses 506, a determination 508 is made as to whether it is ever used as a Principal Diagnosis. This can be accomplished by examining a list of all Primary Diagnoses from the entire data set. For each diagnosis that is ever used as a Principal Diagnosis, a determination 510 is made as to whether the diagnosis maps to a lower-paying DRG ($DRG_2$) than the DRG ($DRG_1$) on the claim of interest. If so, the claim is indicated 512 as a potential case of upcoding from $DRG_2$ to $DRG_1$. If the converse is true, that is the diagnosis maps to a higher-paying DRG ($DRG_3$) than the Principal Diagnosis, the indication 522 is one of potential downcoding 524. Since every diagnosis on the claim is considered, a claim may be marked multiple times for upcoding or downcoding.

Once this has been done for every diagnosis for each claim, all the potential upcoding and downcoding opportunities for every DRG pair are examined 514. This operation counts the number of claims with $DRG_1$ that may have been potentially upcoded from $DRG_2$ and correspondingly counts the number of claims with $DRG_2$ that may have been potentially downcoded from (or not upcoded to) $DRG_1$. The percentage of claims in the higher-paying DRG in every ($DRG_1/DRG_2$) pair [see equation 6 above] is compared 516 to the norm for peer facilities for the pair. This norm is obtained through modules 642, 644 and 652 in a similar manner to the norms obtained for DRG pairs in the earlier discussions. A determination 518 is made as to whether for some pair, this facility charges to the higher-paying DRG much more frequently than its peers. If so, the facility is deemed 520 to be suspicious. If the facility is using the fraudulent software described above, then it may well be the case that for some or many potential upcoding cases, the facility always charges to the higher-paying code.

The fraud detection process 500 is also applicable to all PPS approaches developed so far by CMS. Although modification of the process may be needed to address fields in other data sources, such as the Minimum Data Set (MDS), the Inpatient Rehabilitation Facility Patient Assessment instrument (IRF-PAI), or the Outcomes and Assessment Information Set (see Table 1), the general idea of identifying potential cases of fraud and comparing each of those cases to the facility's peers is similar.

An example will now be described for illustrative purposes. In a claim where a patient is admitted to a hospital for a heart condition (coded as Congestive Heart Failure 428.0), as well as a respiratory condition (coded as Respiratory Failure 518.81), the coding of the Principal Diagnosis is beneficial for determining the DRG. If code 518.81 is selected for the Principal Diagnosis, the resultant DRG would be 87 (Pulmonary Edema, weight 1.3781). However, if code 428.0 is selected for the Principal Diagnosis, the DRG would be 127 (Heart Failure and shock, weight 1.0130), a less expensive DRG. In most cases, CMS rules have specified that given both these diagnoses in a claim, code 428.0 should remain the Principal Diagnosis. Considering the claims with DRGs 87 and 127, where both these diagnoses codes were present in the claim with one of them as the Principal Diagnosis, the proportion of DRG 87 in the pair is then examined. If the facility has a larger proportion of DRG 87 in the pair compared to the norm, further investigation of the facility's claims with these DRGs may be warranted.

These variables are computed in module 634a and compared to peers in 642a and 644a, with the normalization done in 652a. The roll-up is done to the facility level in 646d through 634d. In FIG. 8, the corresponding modules for creation of the profiles are 820 and 830, with the roll-ups performed along the possible paths shown in the figure.

A summary of the metrics described so far is given below in Table 3. It must be noted that the metrics described here are only an example and do not constitute an exhaustive list of the possible metrics that may be derived in accordance with the principles covered by the invention.

TABLE 3

Summary of Metric Examples for Various Levels

| Examples of Metric Types | Driving Element Level Variable | Group Level Variable | Category Level Variable |
|---|---|---|---|
| Activity (e.g. % dollars, claims or clients in each realization) | Across Example 1: Activity across elements within a group (say, across Principal Diags within a DRG) Example 2: Activity across all elements across all groups | Across Example 1: Activity across groups within a category (say, across DRGs within an MDC) Example 2: Activity across all groups across all categories | Across Example: Activity across categories |
| Proportion of counts in group pairs | Within Example: Proportion of more expensive group in pair with upcoding potential based on driving elements | Across Example: Proportion of more expensive group in pair done across all possible group pairs | Within Example: Proportion of more expensive group in all possible pairs of groups obtained from category |
| Time (length of stay/treatment etc.) | Within Example: Average length of clients' stay across claims for the driving element | Within Example: Average length of clients' stay across claims for the group | Within Example: Average length of clients' stay across claims for the category |
| Group Weight (relative cost index, $/diem etc.) | Within Example: Average cost index across all groups that map from driving element Example: Average relative cost index (cost index divided by length of stay) across all groups that map from driving element | | Within Example: Average cost index across all groups in category Example: Average relative cost index (cost index divided by length of stay) across all groups in category |
| Counts | | Within Example: Number of driving elements used in group on the average (say, average number of diagnosis codes per claim for a DRG) | |

This invention describes a common approach to detecting fraud in any PPS system, regardless of the type of facility or the specifics of the driving elements, groups, and categories. For example, the present invention can be used with pharmacies in at least two different ways. One way would be that the pricing is determined by the individual drug that is delivered and that drugs are also aggregated into "drug groups." The present invention can provide analysis within drug groups or across drug groups. Another way to think of pharmaceuticals is to think of the individual active chemicals as the primary classification level, and the actual drug dispensed as at a more aggregate level. In that case, the price is determined at the more aggregate level.

The present invention is applicable to a wide range of applications, beyond the implementations involving PPS systems. For example, this includes other models not relating to PPS, such as pharmacy and physician models, where procedure pairs, or any grouping system of patient illnesses or treatments (such as the recently CMS-developed "Diagnostic Cost Groups/Hierarchical Condition Category", may be considered much like DRG pairs.

It is noted that the particular steps described herein may depart from that described and illustrated, to include more or fewer steps that achieve substantially the same effects. Likewise, the particular capitalization or naming of the protocol, features, attributes or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

We claim:

1. A computer-implemented method for generating fraud indication within a prospective payment system (PPS), the method being implemented by one or more data processors forming part of at least one computer and comprising:

generating, by at least one data processor, profiles of service provider activities rendered for payment by a facility, the profiles being dynamically derived from transactional level data associated with service provider activities;

calculating, by at least one data processor, summary variables from the profiles input into an unsupervised predictive model for at least one particular metric, the at least one metric at any desired level of and associated with the PPS comprising one of:
  an indicator of total costs claimed by the facility at that level;
  an indicator of the facility's average patient length of stay at that level; and
  an indicator of total claims made by the facility at that level;

determining, by at least one data processor, a deviation measure based on comparing the summary variables with industry-wide peer data for the particular metric, wherein comparing the summary variable with industry-wide peer data comprises:
  determining, by at least one data processor, a first distribution based on the summary variables;
  determining, by at least one data processor, a second distribution based on the industry-wide peer data; and
  detecting, by at least one data processor, aberrations between the first distribution and the second distribution;

integrating, by at least one data processor, the aberrations detected to produce normalized variables; and deriving, by at least one data processor, an indicator from the deviation measure, the indicator representing the fraud indication based on aberrations associated with the deviation measure;

wherein a profile is generated by: generating a profile of a first entity, generating a profile of at least one second entity that interacts with the first entity through transactions with the first entity, generating a profile of at least one third entity comprising a combination of the profiles of the interacting first and second entities, and enhancing the profile of the first entity with the profile of the at least one third entity, wherein an interacting pair of entities is itself an entity.

2. The computer-implemented method according to claim 1, wherein the PPS comprises a hierarchical coded payment system selected from a group of Prospective Payment Systems (PPS) comprising Medicare Ambulatory Surgical Center PPS, Medicare Inpatient Hospital PPS, Medicare Skilled Nursing Facility PPS, Medicare Home Health PPS, Medicare Outpatient Hospital PPS, Medicare Inpatient Rehabilitation Facility PPS, Medicare Part C risk adjustment, Medicare Swing Bed Facility PPS, Medicare Long-Term Care PPS, any future Medicare Part B procedure PPS, Medicaid PPS, private insurer's PPS, and national-payer healthcare PPS.

3. The computer-implemented method according to claim 1, wherein the transaction level data is obtained in batches.

4. The computer-implemented method according to claim 1, wherein the transaction level data is obtained from updates made to transactional level data associated with the facility.

5. The computer-implemented method according to claim 2, wherein the hierarchical coded payment system includes a plurality of classification levels defining a payment determined, the plurality of classification levels comprising:
  a primary level including a set of driving elements used to encode the service provider activity at a transactional level;
  an intermediary level including a set of groups, each group mapping one or more driving elements to a particular payment rate; and
  an aggregate level including a set of categories, each category being mapped to one or more of the groups according to predetermined industry classification schemes.

6. The computer-implemented method according to claim 5, wherein the hierarchical coded payment system comprises a Medicare Inpatient Hospital Prospective Payment System, the driving elements comprise Diagnosis Codes, the groups comprise Diagnosis Related Groups, and the categories comprise Major Disease Categories.

7. The computer-implemented method according to claim 5, wherein the driving elements comprise Principal Diagnosis Codes.

8. The computer-implemented method according to claim 5, wherein the hierarchical coded payment system comprises a Medicare Skilled Nursing Facility Prospective Payment System, the driving elements comprise a Minimum Data Set, the groups comprise Resource Utilization Groups, and the categories comprise Major Resource Categories.

9. The computer-implemented method according to claim 5, wherein summary variables comprise one of the data extracted across the primary level, the data extracted within the driving elements, the data extracted across the intermediary level, the data extracted within the groups, the data extracted across the aggregate level, and the data extracted within the categories.

10. The computer-implemented method according to claim 5, wherein calculating summary variables from the data comprises:
  capturing, by at least one data processor, behavioral characteristics across the primary level into a profile;
  deriving, by at least one data processor, the summary variables from the profile.

11. The computer-implemented method according to claim 5, wherein calculating summary variables from the data comprises:

capturing, by at least one data processor, behavioral characteristics within the driving elements into a profile; and deriving, by at least one data processor, the summary variables from the profile.

12. The computer-implemented method according to claim 5, wherein calculating summary variables from the data comprises:

capturing, by at least one data processor, behavioral characteristics across the intermediary level into a profile; and deriving, by at least one data processor, the summary variables from the profile.

13. The computer-implemented method according to claim 5, wherein calculating summary variables from the data comprises:

capturing, by at least one data processor, behavioral characteristics within the groups into a profile; and deriving, by at least one data processor, the summary variables from the profile.

14. The computer-implemented method according to claim 5, wherein calculating summary variables from the data comprises:

capturing, by at least one data processor, behavioral characteristics across the aggregate level into a profile; and deriving, by at least one data processor, the summary variables from the profile.

15. The computer-implemented method according to claim 5, wherein calculating summary variables from the data comprises:

capturing, by at least one data processor, behavioral characteristics within the categories into a profile; and deriving the summary variables from the profile.

16. The computer-implemented method according to claim 5, wherein calculating summary variables from the data comprises:

capturing, by at least one data processor, behavioral characteristics across the facility into a profile; and deriving, by at least one data processor, the summary variables from the profile.

17. The computer-implemented method according to claim 5, wherein calculating summary variables from the data comprises:

capturing, by at least one data processor, behavioral characteristics within the facility into a profile; and deriving, by at least one data processor, the summary variables from the profile.

18. The computer-implemented method according to claim 1, wherein producing the normalized variables further comprises:

merging, by at least one data processor, the summary variables with the industry-wide peer data; and rolling-up, by at least one data processor, the summary variables with the industry-wide peer data.

19. The computer-implemented method according to claim 18, wherein rolling-up the summary variables comprises:

applying, by at least one data processor, a distributional function to a metric across all of the summary variables; and responsive to distributional function applied, determining, by at least one data processor, a scalar quantity representing the normalized variables.

20. The computer-implemented method according to claim 1, wherein deriving an indicator from the deviation measure comprises:

determining, by at least one data processor, a score value for the normalized variables;

producing, by at least one data processor, reasons derived from one or more top significant variables;

supporting, by at least one data processor, the score; and associating, by at least one data processor, a threshold value with the score value, the indicator representing potentially fraudulent service provider activity when a score value exceeds the threshold value.

21. The computer-implemented method according to claim 1, wherein the derived indicator comprises a discrepancy between the summary variables compared with the peer data for the particular metric.

22. The computer-implemented method according to claim 1, wherein the facility is selected from a group of entities comprising healthcare related facilities, healthcare providers, patients, beneficiaries, healthcare claims processors, and skilled nursing facilities.

23. The computer-implemented method according to claim 22, wherein payment is determined according to a payment function associated with the PPS.

24. The computer-implemented method according to claim 1, wherein a PPS comprises a plurality of classification levels defining the payment, the plurality of classification levels comprising:

a driving element level including a set of driving elements used to encode the service provider activity at a transactional level;

a group level including a set of groups, each group mapping one or more driving elements to a particular payment rate; and a category level including a set of categories, each category being mapped to one or more of the groups according to predetermined industry classification schemes.

25. The computer-implemented method according to claim 24, wherein the summary variables comprise one of: summary variables calculated across the driving element level, calculated within the driving elements, calculated across the group level, calculated within the groups, calculated across the category level, and calculated within the categories.

26. A non-transitory computer program product for generating fraud indication within a prospective payment system (PPS), the computer program product storing instructions, which when executed by one or more data processors of at least one computing system, result in operations comprising:

generating, by at least one data processor, profiles of service provider activities rendered for payment by a facility, the profiles being dynamically derived from transactional level data associated with service provider activities;

calculating, by at least one data processor, summary variables from the profiles input into an unsupervised predictive model for at least one particular metric, the at least one metric at any desired level of and associated with the PPS comprising one of:

an indicator of total costs claimed by the facility at that level;

an indicator of the facility's average patient length of stay at that level; and an indicator of total claims made by the facility at that level;

determining, by at least one data processor, a deviation measure based on comparing the summary variables with industry-wide peer data for the particular metric, wherein comparing the summary variable with industry-wide peer data comprises:

determining, by at least one data processor, a first distribution based on the summary variables;

determining, by at least one data processor, a second distribution based on the industry-wide peer data; and detecting, by at least one data processor, aberrations between the first distribution and the second distribution;

integrating, by at least one data processor, the aberrations detected to produce normalized variables; and deriving, by at least one data processor, an indicator from the deviation measure, the indicator representing the fraud indication based on aberrations associated with the deviation measure;

wherein a profile is generated by: generating a profile of a first entity, generating a profile of at least one second entity that interacts with the first entity through transactions with the first entity, generating a profile of at least one third entity comprising a combination of the profiles of the interacting first and second entities, and enhancing the profile of the first entity with the profile of the at least one third entity, wherein an interacting pair of entities is itself an entity.

27. The computer program product according to claim 26, wherein payment is determined according to a payment function associated with the PPS.

28. The computer program product according to claim 27, wherein a PPS comprises a plurality of classification levels defining the payment, the plurality of classification levels comprising:

a driving element level including a set of driving elements used to encode the service provider activity at a transactional level;

a group level including a set of groups, each group mapping one or more driving elements to a particular payment rate; and a category level including a set of categories, each category being mapped to one or more of the groups according to predetermined industry classification schemes.

29. The computer program product according to claim 28, wherein the summary variables comprise one of: summary variables calculated across the driving element level, calculated within the driving elements, calculated across the group level, calculated within the groups, calculated across the category level, and calculated within the categories.

30. A system for generating fraud indication within a prospective payment system (PPS) comprising:

at least one data processors; and memory storing instructions, which when executed by one or more data processors of at least one computing system, result in operations comprising:

generating, by the at least one data processor, profiles of service provider activities rendered for payment by a facility, the profiles being dynamically derived from transactional level data associated with service provider activities;

calculating, by the at least one data processor, summary variables from the profiles input into an unsupervised predictive model for at least one particular metric, the at least one metric at any desired level of and associated with the PPS comprising one of:

an indicator of total costs claimed by the facility at that level;

an indicator of the facility's average patient length of stay at that level; and an indicator of total claims made by the facility at that level;

determining, by the at least one data processor, a deviation measure based on comparing the summary variables with industry-wide peer data for the particular metric, wherein comparing the summary variable with industry-wide peer data comprises:

determining, by the at least one data processor, a first distribution based on the summary variables;

determining, by the at least one data processor, a second distribution based on the industry-wide peer data; and detecting, by the at least one data processor, aberrations between the first distribution and the second distribution;

integrating, by the at least one data processor, the aberrations detected to produce normalized variables; and deriving, by the at least one data processor, an indicator from the deviation measure, the indicator representing the fraud indication based on aberrations associated with the deviation measure;

wherein a profile is generated by: generating a profile of a first entity, generating a profile of at least one second entity that interacts with the first entity through transactions with the first entity, generating a profile of at least one third entity comprising a combination of the profiles of the interacting first and second entities, and enhancing the profile of the first entity with the profile of the at least one third entity, wherein an interacting pair of entities is itself an entity.

31. The system according to claim 30, wherein payment is determined according to a payment function associated with the PPS.

32. The system according to claim 31, wherein a PPS comprises a plurality of classification levels defining the payment, the plurality of classification levels comprising:

a driving element level including a set of driving elements used to encode the service provider activity at a transactional level;

a group level including a set of groups, each group mapping one or more driving elements to a particular payment rate; and a category level including a set of categories, each category being mapped to one or more of the groups according to predetermined industry classification schemes.

33. The system according to claim 32, wherein the summary variables comprise one of: summary variables calculated across the driving element level, calculated within the driving elements, calculated across the group level, calculated within the groups, calculated across the category level, and calculated within the categories.

* * * * *